US012437342B1

(12) United States Patent
Culbertson, II et al.

(10) Patent No.: US 12,437,342 B1
(45) Date of Patent: Oct. 7, 2025

(54) TRACKING RISK BEHAVIOR PROFILE AND CONTROLLING DEVICES BASED ON GAMEPLAY DATA

(71) Applicant: United Services Autmobile Association (USAA), San Antonio, TX (US)

(72) Inventors: William Preston Culbertson, II, Plant City, FL (US); Gregory David Hansen, Fuquay Varina, NC (US); Keegan Patrick Hayes, Whitestown, IN (US); Mark Anthony Lopez, Helotes, TX (US); Will Kerns Maney, New York City, NY (US); Steven Michael Bernstein, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 184 days.

(21) Appl. No.: 18/115,177

(22) Filed: Feb. 28, 2023

Related U.S. Application Data

(60) Provisional application No. 63/314,853, filed on Feb. 28, 2022.

(51) Int. Cl.
*G06Q 40/00* (2023.01)
*A63F 13/79* (2014.01)
*G06Q 40/08* (2012.01)

(52) U.S. Cl.
CPC .............. *G06Q 40/08* (2013.01); *A63F 13/79* (2014.09)

(58) Field of Classification Search
CPC ................................. G06Q 40/08; A63F 13/79

USPC ................................................................ 705/4
See application file for complete search history.

(56) References Cited

U.S. PATENT DOCUMENTS

| 10,357,713 | B1* | 7/2019 | Landers | A63F 13/40 |
| 10,540,670 | B1* | 1/2020 | Richardson | G06Q 10/1095 |
| 11,128,636 | B1* | 9/2021 | Jorasch | G06F 3/0346 |
| 11,315,082 | B2* | 4/2022 | Vaananen | H04M 1/72403 |
| 2019/0020973 | A1* | 1/2019 | Harish | G08G 1/0112 |
| 2021/0342020 | A1* | 11/2021 | Jorasch | G06F 3/011 |
| 2021/0373676 | A1* | 12/2021 | Jorasch | A63F 13/215 |
| 2021/0374391 | A1* | 12/2021 | Jorasch | G06V 40/19 |
| 2021/0399911 | A1* | 12/2021 | Jorasch | H04L 12/1818 |
| 2021/0400142 | A1* | 12/2021 | Jorasch | H04L 65/1069 |

(Continued)

FOREIGN PATENT DOCUMENTS

WO    WO-2015164951 A1 * 11/2015 ............. A63F 13/79

OTHER PUBLICATIONS

Smart Auto Insurance: High Resolution, Dynamic, Privacy-Driven, Telematic Insurance (Year: 2012).*

(Continued)

*Primary Examiner* — Bruce I Ebersman
(74) *Attorney, Agent, or Firm* — Fletcher Yoder, P.C.

(57) ABSTRACT

A risk analysis system is configured to collect and monitor sensor data associated with a user to generate an insurance policy or recommend products/services that may be better suited for the user based on the user's gameplay data, fitness data, streaming data, outdoor activity data, location data, etc. The risk analysis system is configured to correlate all the sensor data and control operations of devices to discourage behavior that may increase risk of an accident or other suitable insurance liabilities.

16 Claims, 10 Drawing Sheets

(56) References Cited

U.S. PATENT DOCUMENTS

2023/0308303 A1\* 9/2023 Jorasch .............. H04L 65/4015
2024/0364548 A1\* 10/2024 Jorasch .............. H04L 12/1831

OTHER PUBLICATIONS

Beyond mobile: research topics for upcoming technologies in the insurance industry (Year: 2003).\*

Daniel M. Russell, "Understanding user behavior at three scales: The AGoogleADay story," Jan. 2014, accessed via https://research.google.com/pubs/archive/44006.pdf.

\* cited by examiner

TRACKING RISK BEHAVIOR PROFILE AND CONTROLLING DEVICES BASED ON GAMEPLAY DATA

CROSS-REFERENCE TO RELATED APPLICATIONS

This application claims priority to U.S. Provisional Application No. 63/314,853, filed Feb. 28, 2022, entitled "TRACKING RISK BEHAVIOR PROFILE AND CONTROLLING DEVICES BASED ON GAMEPLAY DATA," the disclosure of which is incorporated by reference in its entirety for all purposes.

BACKGROUND

The present disclosure relates generally to systems and methods for continuously detecting and monitoring user behavior for products recommendation or insurance determination. More specifically, the present disclosure relates to scraping media consumption data to create a user behavior model for facilitating product recommendations.

Insurance providers may use various techniques and methods to provide competitive services and insurance policies for customers. For example, the insurance providers may determine user insurance policies based on data related to user behavior. However, after the insurance policy is determined, the insurance customer may change behavior resulting in a need to adjust the insurance policy or recommend new products.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a communication component, a storage, and a processor coupled to the communication component and the storage. The processor may receive application data representative of one or more applications used by a user. In response to determining that the application corresponds to a gaming application, the processor may collect game information for the gaming application. The processor may collect user activity data associated with game play by the user for the gaming application. The processor may receive sensor data acquired by one or more devices used by the user. The processor may identify one or more correlations between the user activity data and the sensor data. The processor may generate a gameplay behavior model based on the one or more correlations. The processor may receive an indication of an upcoming activity expected to be performed by the user and determine recommendation data for the upcoming activity based on the gameplay behavior model. The processor may send the recommendation data to a computing device associated with the user. The processor may receive updated sensor data acquired by the one or more devices and adjust a gameplay parameter in response to the updated sensor data being indicative of the user disregarding the recommendation data.

In one embodiment, a method may include receiving, via a processor, application data representative of one or more applications used by a user and, in response to determining that the application data corresponds to a gaming application, collecting game information for the gaming application. The method may include collecting user activity data associated with game play by the user for the gaming application and receiving sensor data acquired by one or more devices used by the user. The method may include identifying one or more correlations between the user activity data and the sensor data and generating a gameplay behavior model based on the one or more correlations. The method may also include receiving an indication of an upcoming activity expected to be performed by the user and determining recommendation data for the upcoming activity based on the gameplay behavior model and sending the recommendation data to a computing device associated with the user. The method may also include receiving updated sensor data acquired by the one or more devices and adjusting a gameplay parameter in response to the updated sensor data being indicative of the user disregarding the recommendation data.

In one embodiment, a non-transitory, computer readable medium may include instructions for a processor to perform operations. The operations may include receiving an indication of an upcoming activity expected to be performed by the user and determining recommendation data for the upcoming activity based on a gameplay behavior model. The gameplay behavior model may be determined based on one or more correlations between user activity data and sensor data acquired by one or more devices used by the user. The user activity data may be collected during game play by the user for a gaming application. The operations may also include sending the recommendation data to a computing device associated with the user. The operations may also include receiving updated sensor data acquired by the one or more devices and restricting access to the gaming application in response to the updated sensor data being indicative of a user disregarding the recommendation data.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
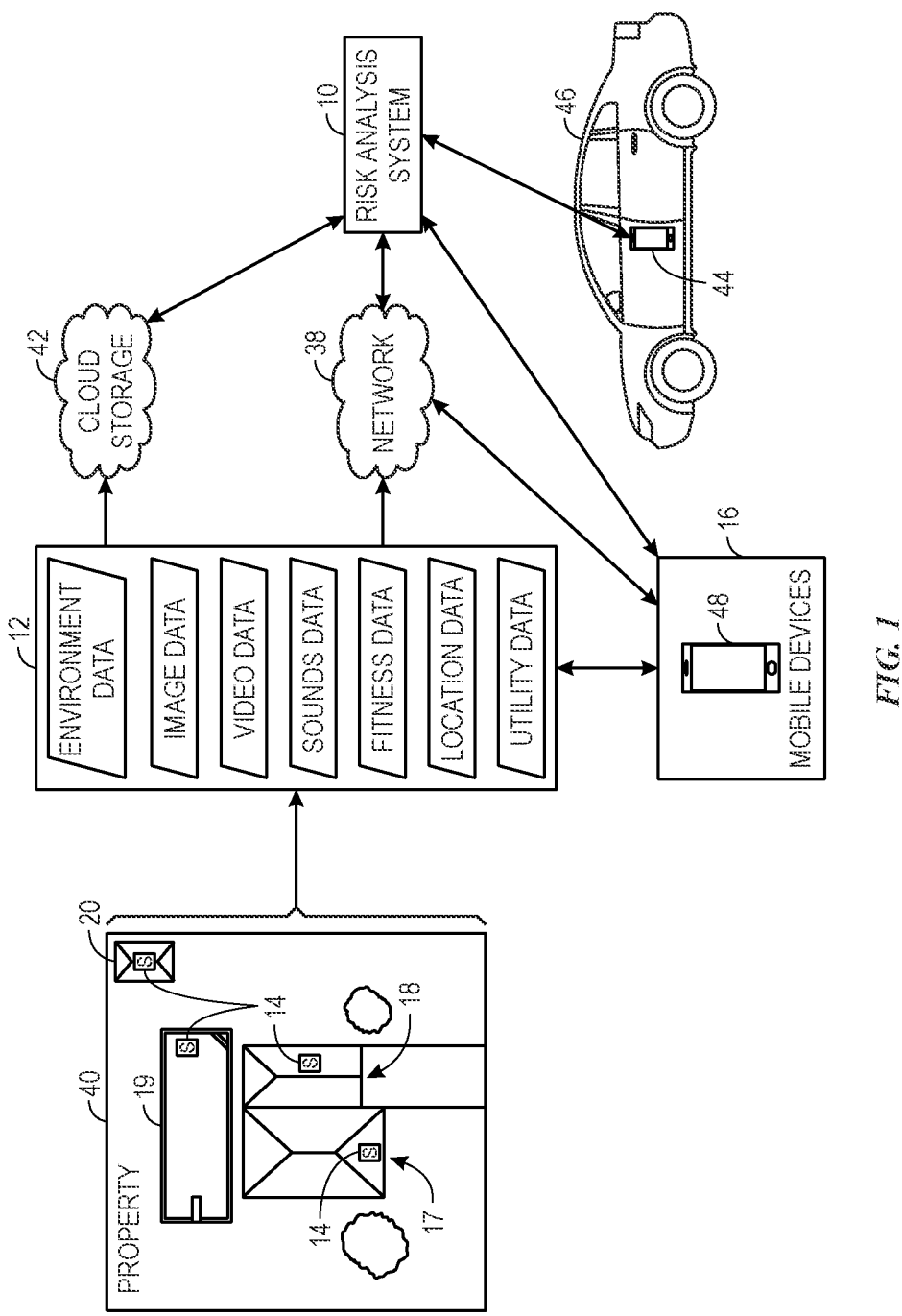
FIG. 1 illustrates a block diagram of a system communicatively coupled to a number of data sources, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Insurance policies may be determined periodically such as on a semi-annual or annual basis for any applicant based on certain information regarding the applicant and type of coverage the applicant is seeking. For instance, when determining an auto insurance policy for an applicant, a risk analysis system of an insurance provider may analyze information of the applicant, such as health information, age, driving behavior, location, and the like to generate some type of insurance policy that may be paid in equal installments throughout the year (e.g., monthly).

However, it is presently recognized that the insurance provider may collect and monitor (e.g., using the risk analysis system) sensor data (e.g., gameplay data, fitness data, streaming data, outdoor activity data, location data, etc.) associated with a user (e.g., an insurance customer) to generate an insurance policy or recommend products/services that may be better suited for the user. By way of example, game behavior models generated for an auto insurance customer who plays more racing games may provide some insight into expected driving behavior for the insurance customer. With this in mind, the risk analysis system may generate different gameplay behavior models based on how individuals play certain video games, the types of video games played by the individuals, and the like and correlate the gameplay behavior models to different driving behavior, which may be verified based on data acquired by sensors in the individual's vehicle. Indeed, the risk analysis system may collect and monitor the user's gameplay data and identify the correlations between the user's driving behavior and the user's gameplay data (e.g., game category information, activities in the game). Based on the identified correlations, the risk analysis system may send product recommendations (e.g., games, music, videos, fitness products, books) or service recommendations (e.g., gym programs, education programs, training programs, financial services, social events) to a computing device associated with the user. In some embodiments, the risk analysis system may limit a user's game play time or ability to access certain games of certain game categories (e.g., restriction on racing game) to modify the user's expected driving behavior. The risk analysis system may adjust the user's auto insurance policy to improve driving behavior. As such, the risk analysis system may generate a better suited auto insurance policy for both the insurance provider and the insurance customer. Additional details with regard to monitoring gameplay data and correlating the gameplay data with risk behavior models will be discuss below with reference to FIGS. 3 and 4.

In addition to generating gameplay behavior models, fitness behavior models may be generated for a health insurance customer who use certain fitness services. With this in mind, the risk analysis system may a fitness behavior model based on how an individual user uses certain fitness services, the types of fitness services used by the user, the location in which the user is positioned, and the like. The fitness behavior models may characterize a user's fitness behavior (e.g., type of preferred fitness activity, fitness schedule) and may be verified based on data acquired by sensors in fitness equipment, wearable devices, and other devices in the individual's home, vehicle, or mobile devices. Moreover, based on the fitness behavior model, the risk analysis system may send product recommendations (e.g., games, music, videos, fitness products, books) or service recommendations (e.g., gym programs, education programs, training programs, financial services, social events) to a computing device associated with the user. In some embodiments, the risk analysis system may identify a fitness partner based on the fitness behavior models and location data of the user and the potential fitness partner. After identifying the potential fitness partner, the risk analysis system may identify a meeting time for the user to meet the fitness partner based on the user and the fitness partner's fitness behavior models and the location data. The risk analysis system may also identify a virtual meeting application, a meeting location, or a meeting time for the user and the fitness partner to meet based on the user and the fitness partner's fitness behavior models and location data. As such, the risk analysis system may help reduce health risks by encouraging relationships with other individuals that share the same fitness goals and behavior, thereby promoting a healthy lifestyle. Additional details with regard to monitoring fitness data and coordinating virtual and/or physical fitness meetings between individuals will be discuss below with reference to FIGS. 5-7.

In addition to using data acquired from smart devices disposed inside a home, vehicle, or other structure, the risk analysis system may generate an area profile model for a user based on naming parameters assigned to certain smart devices. For instance, names assigned to certain outdoor devices in a user's property may provide some insight into the types of rooms, equipment, and devices that the user may have stored at home. These insights may be saved as an area profile model for the user and the risk analysis system may use the model to identify services or products that may be of interest for the user. With this in mind, the risk analysis system may generate an area profile model based on area profile data, such as names or locations of smart devices used by the user, floor maps of user's property, detected user behavior (e.g., gaming behavior, driving behavior, fitness behavior, streaming behavior), local weather information, social events, and the like. The risk analysis system may correlate user area profile data (e.g., furniture on decks, devices in swimming pools, sensors in green houses, infrastructures in backyard) to services or products that may be of interest to the user based on other users' preferences, purchases, and the like. That is, the risk analysis system may receive area profile data and corresponding products and services acquired by other users.

Additionally, the risk analysis system may collect and monitor the user's area profile data and identify the correlations between the user's purchases of services or products and update the user's area profile data to include these purchases. Based on the user's area profile model and other users' area profile models, the risk analysis system may identify product recommendations (e.g., furniture, devices, games, music, videos, fitness products, books) or service recommendations (e.g., loans, lawn services, plumbing services, roof services, fitness programs, education programs, training programs, financial services, social events) for the user and send them to a computing device associated with the user.

In some embodiments, the risk analysis system may identify protective actions to ensure that the user's equipment, as detailed in the area profile model, may secured via insurance policy, operation, or the like based on detected threats. That is, weather advisories or other potential threats to equipment may be determined based on location data, weather data, social data (e.g., social networking data), and the like. Based on detected threats, the risk analysis system may identify a product or service to protect the user's equipment that is identified on the user's area profile model. Additional details with regard to monitoring fitness data and correlating the fitness data with risk behavior models will be discuss below with reference to FIGS. 8 and 9.

In addition, streaming behavior models may be generated for a health or auto insurance customer who use certain streaming application to provide some insight into the living behavior for the user. With this in mind, the risk analysis system may generate different streaming behavior models based on the types of streaming applications used by the individuals, the content viewed via the streaming applications, the location, and the like, and correlate the streaming behavior models to different living or driving behavior, which may be verified based on data acquired by sensors in the individual's home, vehicle, or mobile devices. Indeed, the risk analysis system may collect and monitor the user's streaming data and identify the correlations between the user's living or driving behavior and the user's streaming data. Based on the identified correlations, the risk analysis system may send product recommendations (e.g., accessories, appliances, audios, beauty, books, clothes, electronics, fitness products, foods, gears, games, households, music, personal care products, toys, videos, and the like) or service recommendations (e.g., cleaning services, gym programs, education programs, training programs, financial services, social events, and the like) to a computing device associated with the user. In some embodiments, the risk analysis system may limit a user's streaming time (e.g., not during driving or after a certain time of a day) or duration (e.g., not longer than certain period of time) or an ability to access certain types of streaming applications (e.g., restriction on violent videos) to modify the user's expected living or driving behavior. As such, the risk analysis system may help reduce risks by encouraging good living or driving behaviors. As such, the risk analysis system may generate a better suited health or automobile insurance policy for both the insurance provider and the insurance customer. Additional details with regard to monitoring streaming data and correlating the streaming data with streaming risk behavior models will be discuss below with reference to FIGS. 10-11.

By way of introduction, FIG. 1 is a block diagram of a system that includes a number of data sources that may be employed with embodiments described herein. For example, the system may include a risk analysis system 10 communicatively coupled to a variety of data sources that may assist the risk analysis system 10 in determining an insurance policy for a user (e.g., an insurance customer). Data from the variety of data sources may include insurance data (e.g., existing insurance coverage and premium) related to the user, gameplay data, fitness data, environment data (e.g., temperature, humidity, air quality, noise), visual and image data taken by smart devices or appliances (e.g., videos, images, security footage) related to user activities or circumstances, and the like. Specifically, sensor data 12 may be gathered from a variety of sensors 14, such as smart devices (e.g., smart plugs, smart thermostat, smart lights, smart cleaners) and security appliances (e.g., smart doorbells, cameras, smart locks), mobile devices 16 (e.g., smart phones, laptops, video game consoles), and the like.

As used herein, smart devices may include any suitable computing device that has network components that enable the device to communicatively couple to another computing device (e.g., router, server, mobile device), receive commands via physical inputs, audio inputs (e.g., voice), or the like via the network components, perform some action in response to receiving the inputs, and the like. As such, smart devices may include plugs that may control the distribution of power to connected devices based on commands received via the network or any other suitable device that may perform some operation via commands received the network. In addition, the smart device itself may receive commands and perform operations via the network based on the received commands. For instance, the smart device, such as a smart speaker, may receive an audio command to control a light switch and may issue a command to the light switch via the network in response to receiving the audio command.

Figure 2:
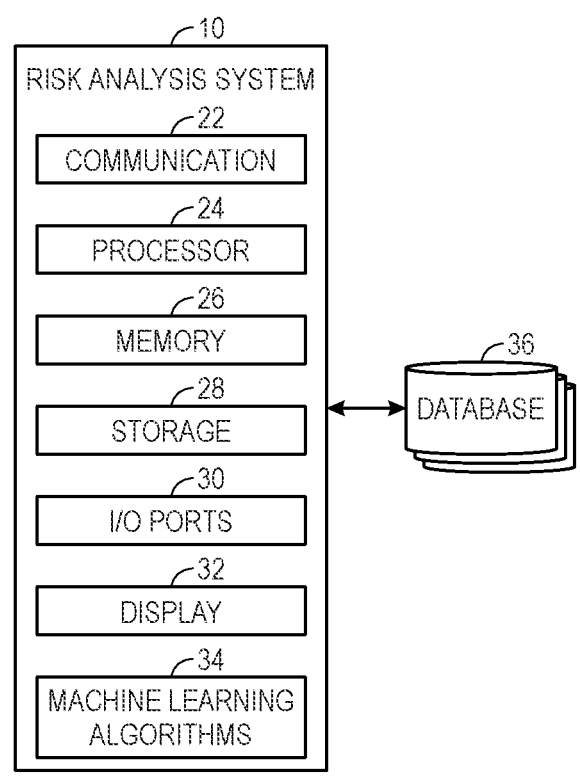
FIG. 2 illustrates a block diagram of a risk analysis system, in accordance with embodiments described herein.

As will be described in more detail below, the risk analysis system 10 may collect data from the various data sources (e.g., those depicted in FIG. 1) and perform various types of analysis to identify products and services that may be better suited for the user. By way of example, FIG. 2 is a block diagram of example components that may be part of the risk analysis system 10. That is, the risk analysis system 10 may include various types of components that may assist the risk analysis system 10 in performing various types of computer tasks and operations. For example, the risk analysis system 10 may include a communication component 22, a processor 24, a memory 26 a storage 28, input/output (I/O) ports 30, a display 32, a machine learning circuitry 34, and the like.

The communication component 22 may be a wireless or wired communication component that may facilitate communication between the risk analysis system 10 and various devices via a network, the Internet, or the like. For example, the communication component 22 may allow the risk analysis system 10 to obtain the data from the variety of data sources, such as databases 36 (e.g., insurance database, sensor data database), cloud storages, mobile devices 16 (e.g., smart phones, laptops, security devices), and the like. The communication component 22 may receive and send notifications to the smart devices and the mobile devices 16. The communication component 22 may use a variety of communication protocols, such as Open Database Connectivity (ODBC), TCP/IP Protocol, Distributed Relational Database Architecture (DRDA) protocol, Database Change Protocol (DCP), HTTP protocol, other suitable current or future protocols, or combinations thereof.

The processor 24 may process instructions for execution within the risk analysis system 10. The processor 24 may include single-threaded processor(s), multi-threaded processor(s), or both. The processor 24 may process instructions stored in the memory 26. The processor 24 may also include hardware-based processor(s) each including one or more cores. The processor 24 may include general purpose processor(s), special purpose processor(s), or both. The processor 24 may be communicatively coupled to other internal components (such as the communication component 22, the storage 28, the I/O ports 30, and the display 32).

The memory 26 and the storage 28 may be any suitable articles of manufacture that can serve as media to store processor-executable code, data, or the like. These articles of manufacture may represent computer-readable media (e.g., any suitable form of memory or storage) that may store the processor-executable code used by the processor 24 to perform the presently disclosed techniques. As used herein, applications may include any suitable computer software or program that may be installed onto the risk analysis system 10 and executed by the processor 24. The memory 26 and the storage 28 may represent non-transitory computer-readable media (e.g., any suitable form of memory or storage) that may store the processor-executable code used by the processor 24 to perform various techniques described herein. It should be noted that non-transitory merely indicates that the media is tangible and not a signal.

The I/O ports 30 may be interfaces that may couple to other peripheral components such as input devices (e.g., keyboard, mouse), sensors, input/output (I/O) modules, and the like. The display 32 may operate as a human machine interface (HMI) to depict visualizations associated with software or executable code being processed by the processor 24. In one embodiment, the display 32 may be a touch display capable of receiving inputs from an operator of the risk analysis system 10. The display 32 may be any suitable type of display, such as a liquid crystal display (LCD), plasma display, or an organic light emitting diode (OLED) display, for example. Additionally, in one embodiment, the display 32 may be provided in conjunction with a touch-sensitive mechanism (e.g., a touch screen) that may function as part of a control interface for the risk analysis system 10. It should be noted that the components described above with regard to the risk analysis system 10 are examples and the risk analysis system 10 may include additional or fewer components relative to the illustrated embodiment.

Referring back to the FIG. 1. In certain embodiments, the risk analysis system 10 may be communicatively coupled to a network 38, which may include collections of risk analysis systems, the Internet, an Intranet system, or the like. The network 38 may facilitate communication between the risk analysis system 10 and various other data sources. For example, the network 38 may be communicatively coupled to sensors 14 associated with a user. In some embodiments, the sensors 14 correspond to one or more respective smart devices located within the user's property 40, either indoors or outdoors. For example, the sensors 14 may be located in various places in the property 40, such as a main building 17 (e.g., a house), a supplementary building 18 (e.g., a man cave, a greenhouse), an outdoor building 19 (e.g., a pool, a deck), a backyard infrastructure 20 (e.g., a utility room, a shed), and the like.

In some embodiments, the network 38 may also be communicatively coupled to databases 36 in the risk analysis system 10, which may store data regarding the user, such as insurance records, behavior data, sensor data, and other information that may be relevant for determining an insurance policy. In some embodiments, the network 38 may be communicatively coupled to cloud storages 42, which may store data regarding the user that may be relevant for determining a user insurance policy. In other embodiments, the network 38 may further be communicatively coupled to mobile devices 16 associated with the user.

In certain embodiments, the sensors 14 may monitor user activities, and visual and physical characteristics of the environment, such as the environment data of the property 40 (e.g. temperature, humidity, air quality, location, weather, etc.) and environment data of the network associated with the property 40 (e.g. internet speed, internet bandwidth, intranet setup). By way of example, the sensors 14 may correspond with smart devices (e.g., pet camera, security camera, smart doorbell, smart lock, smart humidity sensor, smart thermostat), which may be disposed of inside or outside of the property 40 and may capture sensor data 12 corresponding with the user activities inside or outside of the property 40. In another example, the sensors 14 may correspond with one or more smart devices (e.g., smart plugs, smart lights, smart meters), which monitor certain qualities about the property 40, such as utility usage (electricity, gas, water, etc.), air quality, living habits, and the like. In some embodiments, the sensors 14 may be communicatively coupled to other computing devices such as mobile devices 16 (e.g., mobile phones, tablet devices), which may be configured to allow the user to monitor and control the sensors 14. In some embodiments, the sensors 14 may be associated with or integrated in one or more smart devices, mobile devices, or other devices (e.g., router, cable modem) that may monitor user interactions with the respective smart devices, mobile devices, or other devices. By way of example, the sensors 14 may be a resistive film sensor, capacitive sensor, a surface acoustic wave sensor, an infrared image sensor, an optical sensor, or an electromagnetic induction sensor integrated in the touch-panels of the devices. The risk analysis system 10 may use the communication component 22 to receive sensor data 12 generated by the sensors 14 and may store the sensor data 12 in the database 36 or the cloud storage 42. The sensor data 12 acquired by the sensors 14 may be used to determine user activities, visual and physical characteristics of the environment, and the like. Although the sensors 14 are described as being communicatively coupled to the risk analysis system 10 via the network 38, it should also be noted that, in other embodiments, the sensors 14 may be communicatively coupled directly to the risk analysis system 10.

In certain embodiments, the risk analysis system 10 may be communicatively coupled to mobile devices 16 of the user. For example, the mobile devices 16 may include a smart phone that enables the user to generate sensor data 12 (e.g., video, image, location). The risk analysis system 10 may receive the sensor data 12 and additional data (e.g., driving behavior) to create a behavior model representative of the correlations between user activities and the driving behavior. Additionally or alternatively, the user may use mobile devices 16 (e.g., desktop computers, laptops, tablets, video game consoles) to generate sensor data 12 for model creation.

The risk analysis system 10 may also receive the sensor data 12 from a vehicle system 44 that may be part of a vehicle 46. The vehicle system 44 may monitor properties related to driving the vehicle 46. By way of example, the vehicle system 44 may monitor speed data related to the vehicle 46, location data associated with the vehicle 46, braking data related to the vehicle 46, proximity data related to distances between other objects and the vehicle 46 at various times, and the like. The vehicle data may thus provide insight into one or more driving properties of the driver. The risk analysis system 10 may correlate the vehicle data, in some embodiments, with other sensor data 12 to determine whether the user's activities related to some other task or use of other devices (e.g., gameplay systems) has an effect on the monitored driving behavior. By way of example, the mobile devices 16 may include a gameplay console, the mobile device 48, or some other platform that may enable a user to play video games that may be categorized in certain genres or the like. The data collected while the user plays the game may be referred to as gameplay data. The gameplay data may include details related to an avatar associated with the user, types of equipment (e.g., vehicle) used by the user, accessories (e.g., tires, design, clothing) added to the equipment, and the like. The gameplay data may also include information related to a manner in which the user conducts himself while playing the respective game. That is, the user may drive a certain vehicle while playing a role-playing game or racing game and the manner in which the user drives the vehicle in the game may be recorded as gameplay data. As such, the gameplay data may include risk data related to types and number of risks that the user may undertake to pass a stage of the game or the like. In some embodiments, the gameplay data for the user may be compared to gameplay data for other users. The collection of gameplay data may be used to determine an average risk level associated with the users of the game, an above average risk level associated with the users, and the like. The risk level may be quantified based on the amount of digital currency (e.g., acquired during gameplay) used to perform certain in game tasks, one or more gameplay decisions related to performing certain tasks, a degree of difficulty undertaken to perform certain tasks, and the like. The quantified risk level may be determined based on average values or expected values for the game play.

In addition to gameplay data, the risk analysis system 10 may receive fitness data from fitness data sources such as networked fitness equipment (e.g., treadmill, elliptical, weights, rower, wearable device, etc.) The networked fitness equipment may include a machine that enables a user to perform some physical exercise (e.g., rowing, biking, running, swimming) and a communication component that allows the networked fitness equipment to send data regarding the use of the machine and the like to other computing components. As such, in addition to the machinery that allows the user to perform exercises, the fitness equipment may include similar components as described above as part of the risk analysis system 10.

The fitness data collected from sensors of the fitness equipment may include information related to the user's movement, exercise, standing, and other health related properties. The networked fitness equipment may track the user's activity (e.g., type of exercise, frequency of exercise, pattern of exercise, calories burned, times) and send the collected data as fitness data to the risk analysis system 10. The fitness equipment may provide fitness data as the sensor data 12. In this way, the risk analysis system 10 may track fitness activities, frequencies, times, types, and other details related to the use of fitness equipment by a user to generate a fitness model that characterizes a manner (e.g., type of fitness programs, time) in which the user may prefer to exercise.

In certain embodiments, the sensor data 12 may be uploaded to the databases 36 or the cloud storages 42 for the risk analysis system 10 to analyze by using mobile devices 16. In some embodiments, one or more mobile devices 16 (e.g., smart phone) may be used to generate the sensor data 12 and then upload the sensor data 12 to the databases 36 or the cloud storages 42. For example, the sensor data 12 may be generated by one or more mobile devices 16 while the user is traveling, or on other property, or the like, and then the sensor data 12 may be uploaded to the cloud storages 42. In some embodiments, the mobile device 16 may be used to upload sensor data 12 generated by other devices to the databases 36 or the cloud storages 42. In some embodiments, the sensor data 12 may be uploaded to the databases 36 or the cloud storages 42 after the event. For example, the user may interact with one or more devices without connecting to the network 38, and the sensor data 12 generated may be stored on certain devices and uploaded to the databases 36 or the cloud storages 42 sometime later.

After a threshold amount of time, the risk analysis system 10 may receive the stored sensor data 12 and use it together with additional user behavior data during the same period of time to create a model representative of the correlations between certain user activities represented by the stored sensor data 12 and the additional user behavior data. The risk analysis system 10 may generate the user risk profile using the model and compare it to the user risk profile associated with a previously generated model. The risk analysis system 10 may then determine if a change in user risk profile is greater than a threshold. If the change is greater than a threshold, the risk analysis system 10 may determine recommendations related to reducing the risk profile of the user, send the recommendations to the mobile device 16 or other devices associated with the user for display, adjust the operating parameters of the user's devices, and adjust an insurance policy associated with the user. The risk analysis system 10 may then store the updated model and the user risk profile. As such, the model may be continuously updated to continuously modify insurance policies or operating parameters of various devices based on the model associated with the sensor data 12 or the like.

Generating User Gameplay Behavior Model

As discussed above, user's activities with respect to certain video games may affect the user's behavior in other areas (e.g., driving). As such, in some embodiments, the risk analysis system 10 may receive the sensor data 12 that may be representative of the user's gameplay behavior and correlate the gameplay behavior to other detected sensor data (e.g., driving data). The risk analysis system 10 may control operations of a gaming console, other devices (e.g., vehicle), and the like to discourage behavior that may increase risk of an accident or other suitable insurance liabilities.

Figure 3:
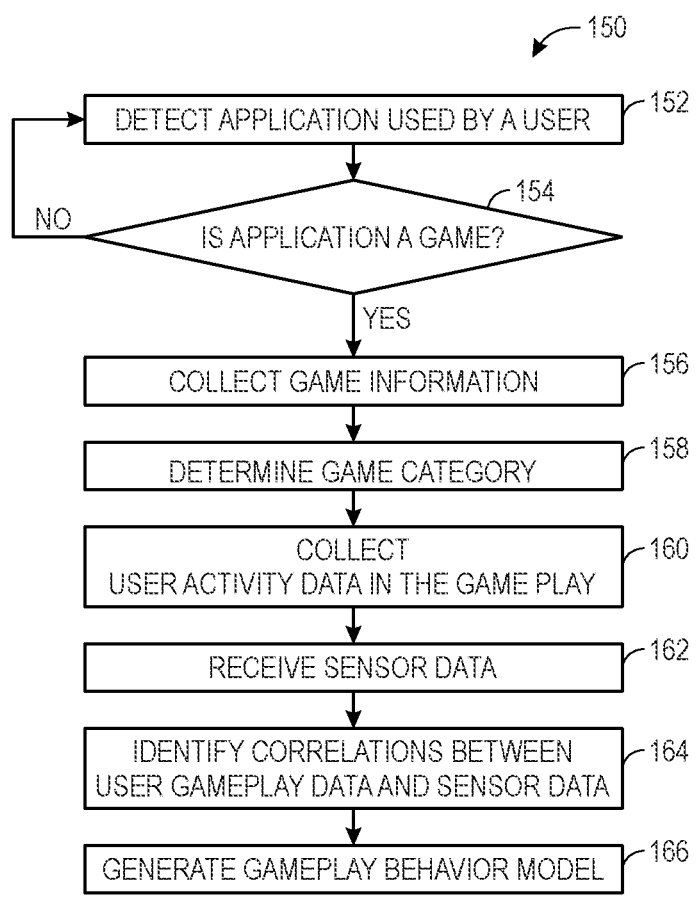
FIG. 3 illustrate a flow chart of a method for generating a gameplay behavior model for a user based on data acquired from the data sources of FIG. 1, in accordance with embodiments described herein.
Figure 4:
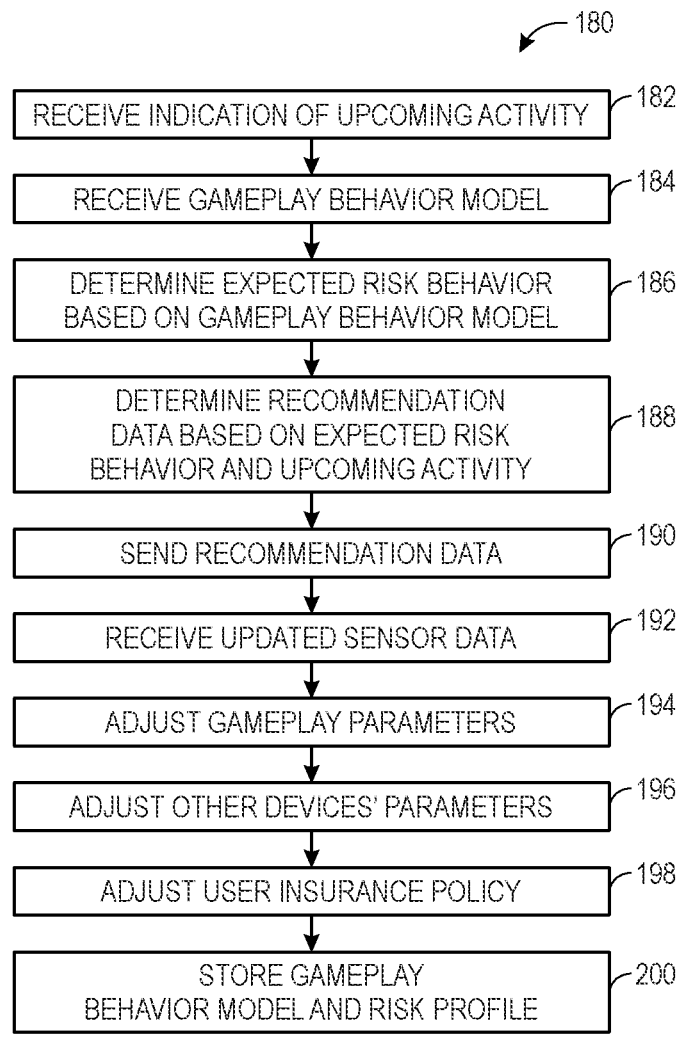
FIG. 4 illustrates a flow chart of a method for adjusting various parameters based on a risk profile determined using the gameplay behavior model, in accordance with embodiments described herein.

With the foregoing in mind, FIGS. 3 and 4 illustrate example methods 150 and 180 for creating and updating a model representative of user gameplay behavior based on data acquired from the data sources described above. The risk analysis system 10 may perform operations described below via the processor 24 based on processor-executable code stored in the memory 26 and the storage 28. The processor 24 may execute the processor-executable code to receive the sensor data 12 analysis and generate models described below. Based on the monitoring and analysis, the risk analysis system 10 may modify an insurance policy for the user, adjust gameplay parameters of one or more games played by the user, and the like.

Although the example described in FIGS. 3 and 4 is described in a particular order, it should be noted that the example method may be performed in any suitable order and is not limited to the order presented herein. It should also be noted that although each processing block is described below in the example method as being performed by the risk analysis system 10, other suitable computing systems may perform the methods described herein.

Referring now to FIG. 3, at block 152, the risk analysis system 10 may detect that an application is being used a user. In some embodiments, the risk analysis system 10 may be an application or program being executed on the same computing device as the application being used. As such, the risk analysis system 10 may monitor the CPU usage data, various memory registers, or other sources of data to determine whether applications are being used by a user. In some embodiments, the risk analysis system 10 may also receive the sensor data 12, which may be provided by devices in which applications are being used by the user. That is, the risk analysis system 10 may periodically acquire or receive data from the sensors 14 and the mobile devices 16. The information received from the sensors 14 may include details related to certain applications or programs being used, such as a type of application, a time, a location, any devices (e.g., electronic glasses, gaming controller, keyboard, mouse) associated with the application, a MAC address, or the like. For example, in some embodiments, data packets received by the risk analysis system 10 as the sensor data 12 may include a MAC address, such that a first portion of the MAC address may indicate that a particular vendor (e.g., manufacturer) is associated with the device sending the sensor data 12 and a second portion of the MAC address may indicate that the smart corresponds to a particular type of device (e.g., tablet, gaming console). As such, the MAC address may indicate to the risk analysis system 10 the particular device being used by the user. In addition to receiving the sensor data 12, the risk analysis system 10 may extract information regarding the application being used by the user through network traffic monitoring, application monitoring software, and the like.

With the foregoing in mind, after detecting the application being used by the user, the risk analysis system 10 may, at block 154, determine whether the application detected at block 154 corresponds to a gaming application. The gaming application may correspond to any suitable type of video game that may be played via a tablet, a gaming console, or other suitable device.

In some embodiments, the risk analysis system 10 may receive gameplay data related to a user playing the gaming application via the data sources described above. That is, the risk analysis system 10 may receive gameplay data that may indicate that an application operating on the mobile devices 16 (e.g., desktop computers, laptops, smart phones, tablets, TVs) or other devices (e.g. Xbox®, Nintendo®, PlayStation®) is being accessed by the user. In this way, the risk analysis system 10 may collect data regarding the use of certain gaming applications (e.g., application information, operating time) and the user's activity in the gaming application (e.g., from the application itself, data communicated to the network 38, from the mobile devices 16, or other suitable devices). For example, the risk analysis system 10 may collect data regarding the application and the user's activity in the application from the network traffic data (e.g., TTL, RTT, network protocol change). The risk analysis system 10 may also collect data regarding the application and the user's activity in the application from the sensors 14 associated with or integrated in the mobile devices 16 or other devices. For instance when playing a gaming application, certain devices, such an accelerometer, a keyboard, a joystick, a gaming controller, a mouse, touch sensors, and other components, may provide indications that the detected application corresponds to a game.

Based on the data collected from the sensor data 12 and the other sources of data described above, the risk analysis system 10 may generate a machine learning model to characterize certain combinations of data (e.g., type of connected devices, gameplay data, times for accessing application) as a predictive model for determining whether the detected application being used at block 152 is a game. In some embodiments, as the risk analysis system 10 collects data (e.g., network data, sensor data 12, gameplay data), the risk analysis system 10 may present a visualization that requests for the user or some other individual to provide an indication of the type of application being used for various combinations of detected or received data. As confirmation feedback is received, the risk analysis system 10 may use machine learning algorithms to better predict whether other applications correspond to the gaming application based on similar patterns. For instance, if gaming applications are executed with a virtual reality headset, a particular gaming console, and during a certain time period more than a threshold amount of times per week, the risk analysis system 10 may add this combination of detected data as part of a model for detecting that gaming application is being used.

After determining that the application is a game, the risk analysis system 10 may, at block 156, collect game information from the gaming application. That is, in some embodiments, the risk analysis system 10 may send a request to the gaming application to provide information related to the game. The information may include a game category (e.g., action, adventure, augmented reality, board game, card game, casino game, role playing gaming, music game, puzzle game, racing gamine, simulation game, sports game, strategy game, word game), a parental rating for the game, and the like. In addition to querying the gaming application, in some embodiments, the risk analysis system 10 may identify the game being executed based on the network traffic data accessible via a router or the like. For example, some gaming applications involve access to a gaming server and the network traffic may identity a host server and thus a game manufacturer or game title, Based on the collected game information, at block 158, the risk analysis system 10 may determine a game category for the game. The game category may indicate a type or genre of game that the user is playing. In some embodiments, the risk analysis system 10 may determine the game category by querying one or more databases that store information related to games, categories for the games, parental ratings for the games, and the like. In addition, the risk analysis system 10 may send a request to the device in which the game is being executed to seek input from the user regarding a game category that corresponds to the game.

At block 160, the risk analysis system 10 may collect user activity data during the game play. The user activity data may include information related to various properties or behaviors engaged by the user during the gameplay. For example, the properties related to game play may include the use and design of an avatar or characters within the game, time periods in which the game is played, amount of money spent on game enhancements or features, user reactions to certain events, and the like. The user activity data may be collected from the gaming application as the user plays the game. In some embodiments, the gaming application may periodically store the behavior and actions of the user during the game play in a time series database that may be accessible by the risk analysis system 10. In other embodiments, the risk analysis system 10 may retrieve user activity data during the game play based on in-game log analysis stored in a game server.

In addition, at block 162, the risk analysis system 10 may collect data regarding the game, the user's activity in the game, and the user's activity outside of gameplay from the sensors 14 associated with or integrated in the game devices or other devices. The sensors 14 may provide insight into a user's temperament and behavior prior to, during, and after playing the respective game. In some embodiments, the sensors 14 may include data related to the user's biometric data (e.g., heartrate, pulse, physical activity) and other health-related parameters that may be received via a wearable sensor or the like. The risk analysis system 10 may collect and store the received sensor data in a time series database and characterize the data as pre-game data, during gameplay data, and post gameplay data.

In addition to the biometric data, the risk analysis system 10 may receive data from the peripheral devices (e.g., mouse, joystick, controller, microphone, camera) that the user uses during the gameplay. The data from the peripheral devices may provide a confirmation that the user is playing a game based on patterns of inputs received from the peripheral devices. In some embodiments, the frequency of inputs, patterns on inputs, pitch of detected voice, force of inputs, and other data features detected by the peripheral devices may enrich the input data or sensor data to provide additional insight into the user's temperament or mood. That is, for example, if the user's pitch is above his baseline voice pitch and the force in which he presses buttons is above a baseline force, the risk analysis system 10 may determine that the user is in an excited or excitable mood.

The sensor data 12 may also include vehicle data that details various properties associated with the user's driving behavior. The vehicle data may thus include braking data indicative of a reaction time used during braking, speed data relative to speed limits, stability data related to a number of lane changes that the user makes, mobile activity data (e.g., using mobile computing device while driving), and the like. In this way, the risk analysis system 10 may receive some insight into the user's driving behavior relative to the user's gameplay data. That is, the user's gameplay data may provide an indication with regard to the user's mood or current behavior properties, which may affect the user's driving behavior. Indeed, certain video games may create a false sense of confidence or enhanced risk behavior that may affect the manner in which the user drives. In addition to the sensor data mentioned above, the risk analysis system 10 may receive the data directly from the user, the network 38, the mobile devices 16, other devices, or other sources (e.g., public records). By way of example, the user may submit data regarding the user's mood or anxiety level directly to the risk analysis system 10 by way of input via the mobile device 16 or the like.

At block 164, the risk analysis system 10 may analyze the collected sensor data 12 and the gameplay data to identify correlations between user gameplay data and the collected sensor data 12. In some embodiments, the risk analysis system 10 may extract information (e.g., location, time) from the sensor data 12 and compare it to the user gameplay data (e.g., location, time) to identify changes in both data sets that correlate or correspond to each other. In some embodiments, the risk analysis system 10 may utilize machine learning algorithms or other identifying techniques to determine the relationship between the user gameplay data and the sensor data 12. By way of example, the machine learning algorithms may correlate game information (e.g. game name, game category) with the sensor data 12 (e.g. driving behavior, fitness data).

After making the comparison, the risk analysis system 10 may determine that some of the sensor data 12 is not related to the user gameplay data and thus refrain from evaluating the respective portion of the sensor data 12 for future analysis. On the other hand, if the sensor data 12 is related to the gameplay data, the risk analysis system 10 may utilize machine learning algorithms or other identifying techniques to determine or identify correlations between the user gameplay data and the sensor data 12. The gameplay data and the sensor data 12 may be determined to be related to each other if each set of data consistently changes within a time period of each other. For instance, if the gameplay data indicates that the user is playing a racing game and the sensor data 12 consistently indicates (e.g., more than a threshold amount of time) that the user drives a vehicle above listed speed limits within an hour after completing the gameplay.

If the gameplay data and the sensor data 12 are related to each other, by way of example, the machine learning algorithms may identify relevant correlations by searching for game information (e.g., game name, game category), sensor data types (e.g., driving behavior, fitness data), or related information recorded in a database based on historical correlations between user gameplay data and the sensor data 12. The machine learning algorithms may update the identified correlations in a database.

With this in mind, the machine learning algorithm may assign risk scores to users based on risk assessments assigned to game categories, game activity data, time profile, and expenditure profile, as presented in Table 1, Table 2, and Table 3 by using example game information. That is, in Table 1, R1, R2 . . . R20 are risk values corresponding to different game categories.

TABLE 1

Game Category Database

| Game Category | Behavior/Risk factor |
|---|---|
| Action | R1 |
| Adventure | R2 |
| AR | R3 |
| Board | R4 |
| Card | R5 |
| Casino | R6 |
| Casual | R7 |
| Family | R8 |
| Indie | R9 |
| Kids | R10 |
| Music | R11 |
| Puzzle | R12 |
| Racing | R13 |
| Role Playing | R14 |
| Simulation | R15 |
| Sports | R16 |
| Strategy | R17 |
| Trivia | R18 |
| Word | R19 |
| Others | R20 |

For example, the risk value R13 for racing games may has different value from the risk value R5 for a card game. By determining the correlations between user's driving behavior and user gameplay data, the risk analysis system 10 may predict when the user may engage in riskier behavior than his expected baseline behavior with respect to driving. The risk analysis system 10 may recommend products or services to the user accordingly. For example, the risk analysis system 10 may suggest the user to spend more time playing card games instead of play racing games. The risk analysis system 10 may also limit the user's screen time for a certain game. In some instances, the risk analysis system 10 may adjust user's insurance policy based on the user's gameplay data with respect to the risk values.

Table 2 illustrates information stored in a database corresponding to the correlations of user game activity data and user behavior/risk value for role playing games. Ra, Rb . . . Rc are risk values corresponding to user game activity data. For example, a user's reaction to a certain event or use of a certain character avatar may provide some insight into the user's behavior or personality.

TABLE 2

Game activity data for Role Playing Game

| Profile Information | Behavior/Risk factor | Reaction Information | Behavior/Risk factor |
|---|---|---|---|
| Avatar | Ra | Reaction to a certain Event: actions reaction time | Re |
| Characters/Roles | Rr | Reaction to a certain character: actions reaction time | Rc |
| Time Spending profile | Rt | | |
| Money Spending profile | Rm | | |

The time and expenditure profiles may provide insight into an amount of time and resources that a user may attribute to the gameplay. As such, the risk analysis

TABLE 3-1

Time Profile

| Time Spending Information | Behavior/Risk factor |
|---|---|
| Chatting time ratio | Rct |
| Action time ratio | Rat |
| Shopping time ratio | Rst |
| Traveling time ratio | Rtt |
| Team/individual time ratios | Tit |

TABLE 3-2

Expenditure Profile

| Money Spending Information | Behavior/Risk factor |
|---|---|
| Clothing/Jewelry spending ratio | Rcj |
| Weapon/Tool spending ratio | Rwt |
| Program spending ratio | Rps |
| Supply spending ratio | Rss | system 10 may gain insight into a type of services and products that may be appealing to the user. In addition, certain avatars may be associated with certain risk values. For example, risk value Ra may have different values corresponding to different avatars, Rt may have different values corresponding to different time spending profile, and Rm may have different values corresponding to different money spending profile. Table 3-1 and Table 3-2 illustrate parameters (e.g., chatting time ratio, clothing/jewelry spending ratio) that may be used to determine the time profile and the expenditure profile, respectively. For example, the chatting time ratio may be the ratio of the time spent on chatting over the user's total game time during a period. The clothing/jewelry spending ratio may be the ratio of the money spent on clothing/jewelry over the user's total spending amount in the game during a period. Rct, Rat . . . Rss are risk values corresponding to user game activity data. For example, user may have different risk profile corresponding to different time spending profile in a game. By way of example, a user who spends more time on chatting or shopping may have different risk profile than those who spend more time on action. The user's total screen time while playing game may provide insight into physical fitness of the user.

After identifying the correlations, the risk analysis system 10 may proceed to block 166 and generate a gameplay behavior model based on the correlations between the user gameplay data and the sensor data 12. The gameplay behavior model may provide an expected risk score or expected behavior data (e.g., driving behavior, health behavior) based on the user's gameplay data (e.g., type of game played, amount of time played). The expected behavior data may correspond to expected driving behavior data, expected fitness behavior data, and the like.

Based on the expected behavior data provided in the gameplay behavior model, the risk analysis system 10 may generate recommendations, modify gameplay parameters, adjust vehicle system parameters, or the like. That is, the risk analysis system 10 may attempt to modify the user's behavior to reduce a risk of injury or accident when driving a vehicle, exercising, or performing any similar activity that may be affected by the user's gameplay.

With this in mind, FIG. 4 illustrates a flow chart of a method 180 that the risk analysis system 10 may perform to encourage a certain type of behavior in view of the user's gameplay behavior model. As mentioned above with respect to FIG. 3, the method 180 will be described as being performed by the risk analysis system 10 and in a particular order, but it should be noted that the method 180 may be performed by other suitable computing devices and in any suitable order.

Referring now to FIG. 4, at block 182, the risk analysis system 10 may receive an indication of an upcoming activity to be performed by the user. The activity may include accessing a vehicle to drive, taking a walk, meeting a friend, or the like. In some embodiments, the upcoming activity may be detected based on meeting data (e.g., calendar entry), an input received via a global positioning system or the mobile device 16, or the like. In addition, if the user was playing a game, a certain activity may be expected to be performed after the gameplay. In addition, the risk analysis system 10 may predict user upcoming activity data based on patterns of behavior identified based on machine learning techniques and the like. For instance, the user may be expected to travel to a certain location every morning based on his location data indicative of the travel.

After detecting the upcoming activity, at block 184, the risk analysis system 10 may receive gameplay behavior model associated with the user, and, at block 186, the risk analysis system 10 may determine expected risk behavior based on the received gameplay behavior model. In some embodiments, the expected risk behavior may be related to games played by the user within a threshold amount of time.

Based on the received gameplay behavior model, the risk analysis system 10 may determine expected risk behavior. In some embodiments, the risk analysis system 10 may receive an indication (e.g., via Bluetooth connection to vehicle) that the user is driving a vehicle. Based on the expected drive and the expected risk behavior associated with the user's gameplay behavior model, the risk analysis system 10 may, at block 188, determine recommendation data. The recommendation data may include recommended precautions against speeding, recommended reminders for braking, and other recommendations. The recommendation data may be based on the relationship between the upcoming activity and the gameplay data associated with the user. That is, certain games may cause users to drive in an expected fashion, and the risk analysis system 10 may generate recommendations to ensure that the user isn't negatively affected by the gameplay.

At block 190, the risk analysis system 10 may send the recommendation data to the mobile device 16 or any other suitable device associated with the user. The recommendation data may cause the mobile device 16 to automatically open or execute an application to provide a visual, audible, or haptic notification to the user. In this way, the user may be notified in real time to sufficiently inform the user of the recommendations to improve the user's behavior and reduce driving risks.

After sending the recommendation data, at block 192, the risk analysis system 10 may receive updated sensor data 12. The updated sensor data 12 may confirm whether the user is heeding the notifications and recommendations. Based on the updated sensor data 12, the risk analysis system 10 may adjust gameplay parameters, adjust other device parameters, and adjust user insurance policies accordingly.

That is, at block 194, the risk analysis system 10 may modify gameplay parameters based on the updated sensor data 12 indicative of the user following the recommendations or not. If the user follows the recommendations, the risk analysis system 10 may enable the user to access various game equipment, increase game play time limits, provide additional gameplay features (e.g., equipment, extra life, avatar skins, items to use in gameplay), and the like. Conversely, if the user does not follow the recommendations or the updated sensor data 12 indicates that the user engages in behavior that is not consistent with a baseline behavior (e.g., driving speed limit, avoiding mobile phone activity), the risk analysis system 10 may adjust the gameplay parameters to reduce the features available to the user.

At block 196, the risk analysis system 10 may adjust other devices' parameters (e.g., the speed limit on user's vehicle). The other devices may include applications (e.g., gaming, social media) on the mobile device 16 or the like. In addition, the device parameters may include access to a vehicle, operations of the vehicle, accessories (e.g., radio, GPS) of the vehicle, driving parameters (e.g., speed, locations) of the vehicle, and the like.

With an accurate representation of the user risk profile, the risk analysis system 10 may determine an updated insurance policy based on the updated sensor data 12. The adjusted policy information may include modified premium values based on the updated sensor data 12. That is, if the user followed the recommendations or improved his driving behavior, the risk analysis system 10 may reduce the premium. The risk analysis system 10 may then send an additional notification to the use's device to display the adjusted insurance policy for the user to view. The risk analysis system 10 may present multiple new policies for the user to select based on different factors (e.g., levels of insurance premiums). Such automatic notification may be beneficial for the user because it allows the user to maintain an accurate and complete policy.

At block 198, the risk analysis system 10 may update the database 36 with the new gameplay behavior model, which may be updated based on the user's updated sensor data 12. After updating the model, the risk analysis system 10 may store the updated model in the database 36 at block 200. In some embodiments, the risk analysis system 10 may replace the current gameplay behavior model with the new gameplay behavior model. Additionally, the risk analysis system 10 may store the user risk profiles that were generated to the databases 30 or the cloud storages 42 at block 200. In some embodiments, the risk analysis system 10 may automatically erase the sensor data 12 used in creating the model from the databases 30 or the cloud storages 42 to make space in the databases 36. In some embodiments, the risk analysis system 10 may send a prompt to the mobile device 16 asking the user if the sensor data 12 stored in the databases 36 or cloud storages 42 may be erased. For example, the user may want to save sensor data 12 for future reference rather than erase it immediately after model creation.

Generating User Fitness Behavior Model

As mentioned above, the risk analysis system 10 may receive the sensor data 12 that may include fitness data acquired from fitness equipment, wearable devices, and the like. Based on the fitness data, the risk analysis system 10 may identify other individuals that may have similar fitness behavior profiles, such that the risk analysis system 10 may coordinate meetings between the individuals to encourage the fitness behavior.

Figure 5:
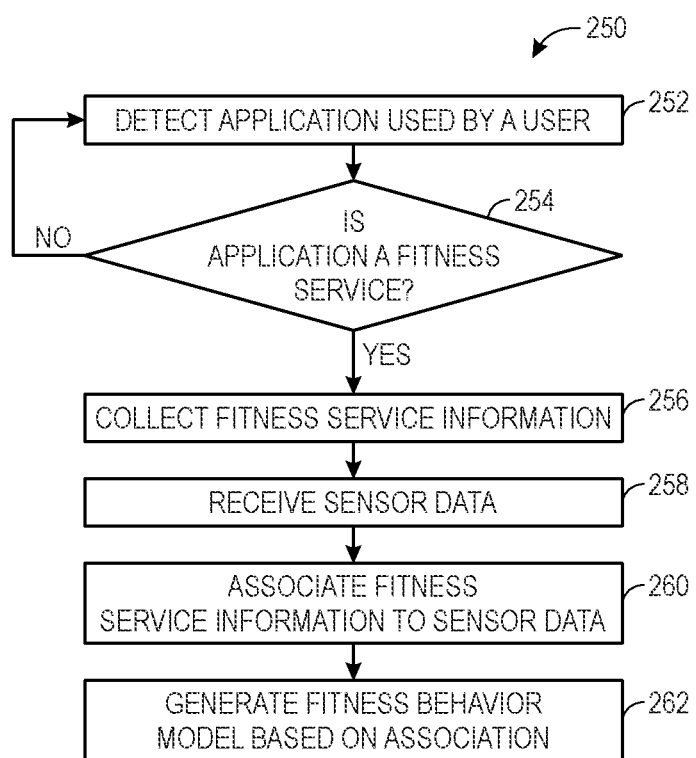
FIG. 5 illustrates a flow chart of a method for generating a user fitness behavior profile based on the data acquired from the data sources of FIG. 1, in accordance with embodiments described herein.
Figure 6:
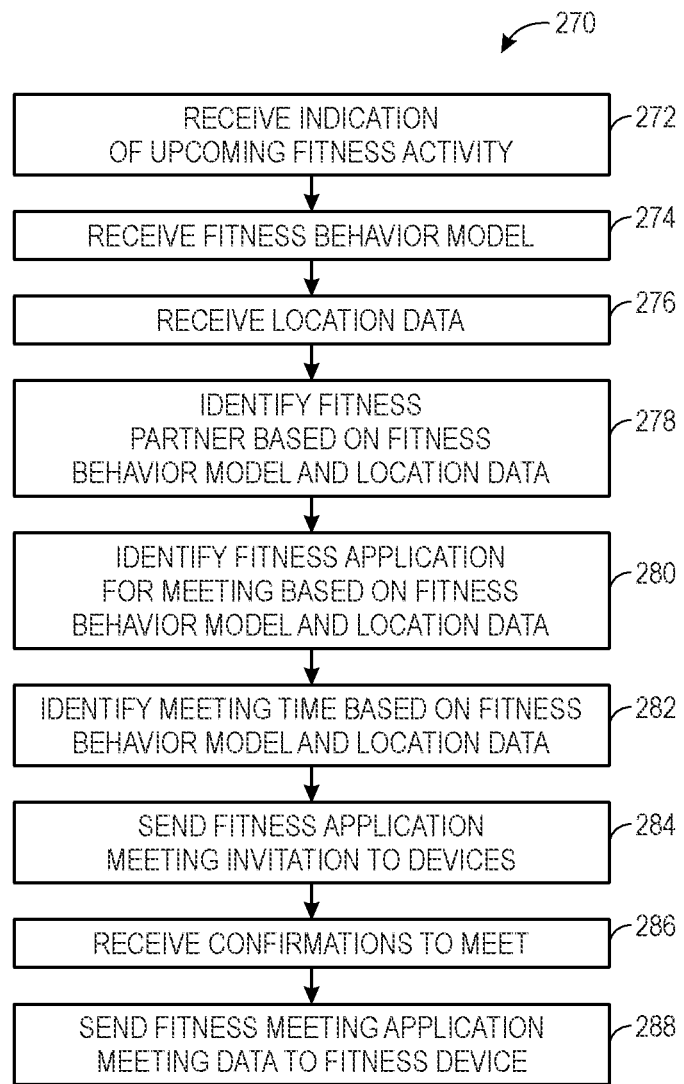
FIG. 6 illustrates a flow chart of a method for coordinating meetings between individuals based on the fitness behavior profile, in accordance with embodiments described herein.
Figure 7:
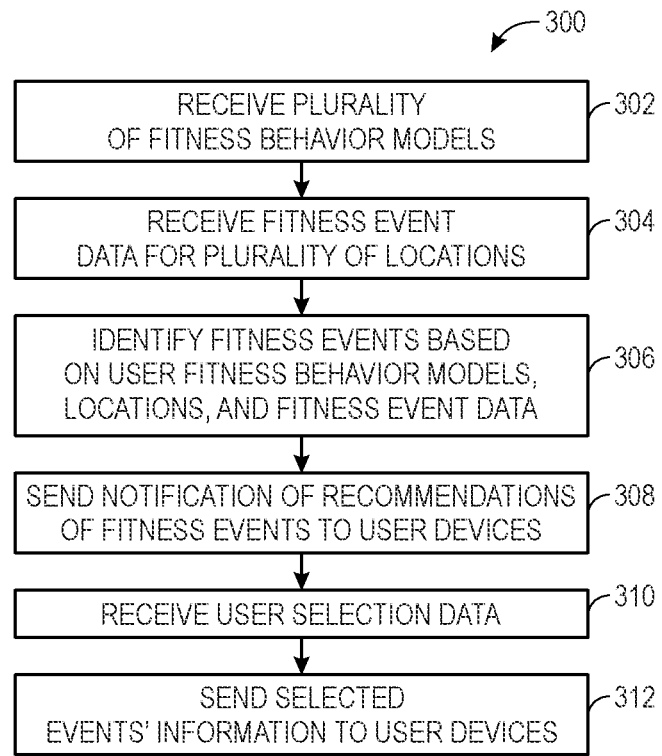
FIG. 7 illustrates a flow chart of a method for recommending fitness events based on the fitness behavior model, in accordance with embodiments described herein.

With this in mind, FIGS. 5-7 illustrates an example method for creating and updating a model representative of user fitness behavior based on data acquired from the data sources described above. The risk analysis system 10 may perform operations described below via the processor 24 based on processor-executable code stored in the memory 26 and the storage 28. The processor 24 may execute the processor-executable code to perform sensor data 12 analysis and model creation.

Although the example described in FIGS. 5-7 is described in a particular order, it should be noted that the example method may be performed in any suitable order and is not limited to the order presented herein. It should also be noted that although each processing block is described below in the example method as being performed by the risk analysis system 10, other suitable computing systems may perform the methods described herein.

Referring now to FIG. 5. FIG. 5 illustrates a flow chart of a method 250 that the risk analysis system 10 may generate a fitness behavior model for a user. At block 252, the risk analysis system 10 may detect that an application is being used by a user. In some embodiments, the risk analysis system 10 may be an application or program being executed on the same computing device as the application being used. As such, the risk analysis system 10 may monitor the CPU usage data, various memory registers, or other sources of data to determine whether applications are being used by a user. In some embodiments, the risk analysis system 10 may also receive the sensor data 12, which may be provided by devices in which applications are being used by the user. That is, the risk analysis system 10 may periodically acquire or receive data from the sensors 14 and the mobile devices 16. The information received from the sensors 14 may include details related to certain applications or programs being used, such as a type of application, a time, a location, any devices (e.g., treadmill) associated with the application, a MAC address, or the like. For example, in some embodiments, data packets received by the risk analysis system 10 as the sensor data 12 may include a MAC address, such that a first portion of the MAC address may indicate that a particular vendor (e.g., manufacturer) is associated with the device sending the sensor data 12 and a second portion of the MAC address may indicate that the smart corresponds to a particular type of device (e.g., tablet, gaming console). As such, the MAC address may indicate to the risk analysis system 10 the particular device being used by the user. In addition to receiving the sensor data 12, the risk analysis system 10 may extract information regarding the application being used by the user through network traffic monitoring, application monitoring software, and the like.

With the foregoing in mind, after detecting the application being used by the user, the risk analysis system 10 may, at block 254, determine whether the application detected at block 252 corresponds to a fitness service. The fitness service may correspond to any suitable type of fitness program that may be played via a tablet, a fitness device, or other suitable device. In some embodiments, the risk analysis system 10 may also collect user data related to user's fitness behavior via mobile devices 16 or via other fitness devices (e.g., wearable devices). In some embodiments, the user may execute an application operating on mobile devices 16 (e.g., desktop computers, laptops, smart phones, tablets, TVs) or other fitness devices (e.g. treadmill), and the risk analysis system 10 may use a program (e.g., fitness monitoring program) to collect data regarding the application (e.g. application information, operating time) and the user's activity in the application by communicating with the application, the network 38, the mobile devices 16, other fitness devices, or the like. For instance, the risk analysis system 10 may collect data regarding the application and the user's activity in the application from the network traffic data (e.g., TTL, RTT, network protocol change), which may include data packets transmitted to servers or devices that host fitness data and the like. The risk analysis system 10 may also collect data regarding the application and the user's activity in the application from the sensors associated with or integrated in the mobile devices 16 or other devices. For instance when using a fitness application, certain devices, such as an accelerometer, a treadmill, touch sensors, weight sensors, image cameras, and other components, may provide indications that the detected application corresponds to a fitness application due to the sensors synchronizing its output data with the application or the like.

Based on the data collected from the sensor data 12 and the other sources of data described above, the risk analysis system 10 may generate a machine learning model to characterize certain combinations of data (e.g., type of connected devices, location data, times for accessing application) as a predictive model for determining whether the detected application being used at block 252 is a fitness application. In some embodiments, as the risk analysis system 10 collects data (e.g., network data, sensor data 12, location data), the risk analysis system 10 may present a visualization that requests for the user or some other individual to provide an indication of the type of application being used for various combinations of detected or received data. After confirmation feedback is received, the risk analysis system 10 may use machine learning algorithms to better predict whether other applications correspond to the fitness application based on similar patterns. For instance, if fitness applications are executed with a virtual reality headset, a particular fitness device, and during a certain time period more than a threshold amount of times per week, the risk analysis system 10 may add this combination of detected data as part of a model for detecting that fitness application is being used.

After determining that the application is a fitness service program, the risk analysis system 10 may, at block 256, collect fitness service information, for example, type of fitness service, user location, and user activity in the fitness service (e.g., type of activity, length of activity, intensity of activity, activity starting time, activity duration, and the like) from the fitness application. That is, in some embodiments, the risk analysis system 10 may send a request to the fitness application to provide information related to the fitness service. The information may include a fitness category (e.g. yoga, running, weightlifting), a rating for the fitness service, and the like. In addition to querying the fitness application, in some embodiments, the risk analysis system 10 may identify the fitness service being executed based on the network traffic data accessible via a router or the like. For example, some fitness applications involve access to a fitness service server and the network traffic may identify a host server and thus a fitness service provider or fitness service title.

In addition, at block 258, the risk analysis system 10 may collect data regarding the fitness service, the user's activity in the fitness service, and the user's activity outside of fitness service (e.g., user personality, music played during the fitness activity, video played during the fitness activity) from the sensors 14 associated with or integrated in the fitness devices or other devices. As described above, the risk analysis system 10 may receive information from the user, the network 38, the sensors 14, the mobile devices 16, other devices, or other sources (e.g. social media). The sensors 14 may provide data related to a user's physical/mental conditions, temperament, and behavior prior to, during, and after using the respective fitness service. In some embodiments, the sensors 14 may include data related to the user's biometric data (e.g., heartrate, pulse, physical activity) and other health-related parameters that may be received via a wearable sensor or the like. The risk analysis system 10 may collect and store the received sensor data in a time series database and characterize the data as pre-fitness data, during fitness data, and post fitness data.

In addition to the biometric data, the risk analysis system 10 may receive data from the peripheral devices (e.g., balance board, controller, microphone, camera) that the user uses during the fitness service. The data from the peripheral devices may provide a confirmation that the user is using a fitness service based on patterns of inputs received from the peripheral devices. In some embodiments, the frequency of inputs, patterns on inputs, pitch of detected voice, force of inputs, and other data features detected by the peripheral devices may enrich the input data or sensor data to provide additional insight into the user's physical/mental conditions, temperament, and behavior. That is, for example, if the user's heartrate is above his average rate and his body temperature is above a baseline temperature, the risk analysis system 10 may determine that the user is working on an intense fitness activity.

The sensor data 12 may also include vehicle data received from a vehicle system 44 that may be part of a vehicle 46, which details various properties associated with the user's driving behavior. The vehicle data may thus include braking data indicative of a reaction time used during braking, speed data relative to speed limits, stability data related to a number of lane changes that the user makes, mobile activity data (e.g., using mobile computing device while driving), and the like. In this way, the risk analysis system 10 may receive some insight into the user's driving behavior relative to the user's fitness activity. That is, the user's fitness service information data may provide an indication with regard to the user's physical/mental conditions, which may affect the user's driving behavior. Indeed, certain fitness service may have effect on some physical/mental conditions that may affect the manner in which the user drives. In addition to the sensor data mentioned above, the risk analysis system 10 may receive the data directly from the user, the network 38, the mobile devices 16, other devices, or other sources (e.g., public records). By way of example, the user may submit data regarding the user's physical/mental conditions directly to the risk analysis system 10 by way of input via the mobile device 16 or the like.

At block 260, the risk analysis system 10 may analyze the collected fitness service information and the collected sensor data 12 to identify correlations between user fitness service information and the collected sensor data 12. In some embodiments, the risk analysis system 10 may extract information (e.g., location, time) from the sensor data 12 and compare it to the user fitness service information (e.g., location, time) to identify changes in both data sets that correlate or correspond to each other. In some embodiments, the risk analysis system 10 may utilize machine learning algorithms or other identifying techniques to determine the relationship between the user fitness service information and the sensor data 12. By way of example, the machine learning algorithms may correlate fitness service information (e.g. fitness application name, category) with the sensor data 12 (e.g. driving behavior, gameplay data).

After performing the comparison analysis, the risk analysis system 10 may determine that some of the sensor data 12 is not related to the user fitness service information (e.g., due to lack of correlations) and thus refrain from evaluating the respective portion of the sensor data 12 for future analysis. On the other hand, if the sensor data 12 is related to the fitness service information, the risk analysis system 10 may utilize machine learning algorithms or other identifying techniques to determine or identify correlations between the user fitness service information and the sensor data 12. The fitness service information and the sensor data 12 may be determined to be related to each other if each set of data consistently changes within a time period of each other.

If the user fitness service information and the sensor data 12 are related to each other, by way of example, the machine learning algorithms may identify relevant correlations by searching for user fitness service information (e.g., fitness service name, category), sensor data types (e.g., driving behavior, gameplay data, fitness data), corresponding devices generated the additional data, or related information recorded in a database based on historical correlations between user fitness service information and the sensor data 12. The machine learning algorithms may update the identified correlations in a database.

After identifying the correlations, the risk analysis system 10 may proceed to block 262 and generate a fitness behavior model based on the identified correlations between the user fitness service information and the sensor data. The fitness behavior model may provide expected behavior data (e.g., living behavior, health behavior) based on the user's fitness service information (e.g., type of fitness service used, amount of time used, location information). The expected behavior data may correspond to expected driving behavior data, expected fitness behavior data, and the like.

Based on the expected behavior data provided in the fitness behavior model, the risk analysis system 10 may generate recommendations of services (e.g., fitness programs), product (e.g., fitness devices, books, games, videos), events (e.g., fitness events, social events), or the like. Additionally, the risk analysis system may identify fitness partners, coordinate meetings with other individuals, and the like.

With this in mind, FIG. 6 illustrates a flow chart of a method 270 that the risk analysis system 10 may identify fitness partners and coordinate a meeting with the identified fitness partners to encourage a certain type of fitness behavior in view of the user's fitness behavior model and upcoming fitness activity. As mentioned above with respect to FIG. 5, the method 270 will be described as being performed by the risk analysis system 10 and in a particular order, but it should be noted that the method 270 may be performed by other suitable computing devices and in any suitable order.

Referring now to FIG. 6, at block 272, the risk analysis system 10 may receive an indication of an upcoming fitness activity to be performed by the user. The risk analysis system 10 may predict the user's upcoming activity data based on patterns of behavior identified based on machine learning techniques and the like. For instance, the user may be expected to travel to a certain location every morning based on his location data indicative of the travel. The user may also be expected to use a certain fitness service or application every evening based on his fitness service information.

After detecting the upcoming activity, at block 274, the risk analysis system 10 may receive the fitness behavior model for the user and fitness behavior models of other users. The risk analysis system 10 may receive the fitness behavior models from the storage 28, the network 38, the cloud storage 42, the database 36, or other sources (e.g., public records). The risk analysis system 10 may also receive the fitness behavior models from the fitness applications.

At block 276, the risk analysis system 10 may receive location data associated with the other users. The risk analysis system 10 may receive the location data from the storage 28, the network 38, the cloud storage 42, the database 36, or other sources (e.g., public records). The risk analysis system 10 may also receive the location data from the fitness applications.

Based on the received fitness behavior models and location data, at block 278, the risk analysis system 10 may identify potential fitness partners with similar fitness behavior models as the user and located within a proximity (e.g., threshold distance) of the user location. That is, the fitness model of the user and the fitness models of other users may be compared to each other to identify similarities. The similarities may include types of fitness activities performed, types of fitness equipment used, times in which fitness activities are performed, locations of fitness activities, and the like. Based on the similarities, the risk analysis system 10 may identify potential fitness partners for the user that have similar fitness profiles. As such, the identified individuals may enable the user to continue to maintain his/her fitness, identify likeminded individuals, and the like, meeting locations, meeting methods, and meeting times.

After identifying potential fitness partners, at block 280, the risk analysis system 10 may identify a fitness application that the potential fitness partner and the user may use to host a virtual meeting. The risk analysis system 10 may identify the fitness application to propose a virtual meeting based on the fitness profiles of the user and the fitness partner. That is, the user and the fitness partner may have multiple fitness applications but share a subset of the fitness applications. The shared fitness applications may be identified at block 280. In some embodiments, the risk analysis system 10 may determine that the user and the fitness partner use the same fitness application during a specific time period. This fitness application may thus be identified as an application to propose to both the user and the fitness partner(s) at block 280. The risk analysis system 10 may identify a fitness application that used by the user and the fitness partner based on their fitness behavior models and location data. For example, the user and the fitness partner may use the same fitness service application (e.g., fitness application on mobile devices). The risk analysis system 10 may also recommend a fitness application to the user or the fitness partner or both based on their fitness behavior models, or location data, or both. By way of example, the user may not use a certain fitness application but the risk analysis system 10 may determine that the user may have interest in the fitness application based on the user fitness behavior model and/or location data. In some embodiments, the risk analysis system 10 may send a request for confirmation to computing devices associated with the user and the fitness partner, such that it receives confirmation input from the user and the fitness partner to meet via the identified fitness application.

At block 282, the risk analysis system 10 may identify a meeting time based on the user and the fitness partner's fitness behavior models and their location data. For virtual meetings, the risk analysis system 10 may identify meeting time based on the user and the fitness partner's identified behavior patterns detected using machine learning techniques and the like. By way of example, the user and the fitness partner may both conduct a fitness activity between 7 and 9 p.m. each weeknight, and the risk analysis system 10 may identify a meeting time during the same time frame based on the user's and the fitness partner's fitness behavior patterns.

After identifying the meeting time/location, the risk analysis system 10 may proceed to block 284 and send meeting invitation to the user devices (e.g., calendar device, virtual meeting device, vehicle, fitness device, or mobile device) associated with the user and the identified fitness partner. The risk analysis system 10 may display the invitation on the user devices, or play an audio or a video of the meeting invitation on the user devices. The invitation may cause the mobile device 16 to automatically open or execute an application to provide a visual, audible, or haptic notification to the user. The risk analysis system 10 may display the invitation using different languages (e.g., English, Chinese, Germany, and the like) or/and sign languages/codes (e.g., American Sign Language). The risk analysis system 10 may play the audio or video of the invitation using different languages (e.g., English, Chinese, Germany, and the like) or/and sign languages/codes (e.g., American Sign Language).

At block 286, the risk analysis system 10 may receive confirmations of the meeting from the user through user input (e.g., typing, recording, sign language) on user devices (e.g., fitness devices, mobile devices, smart appliances, vehicles). The risk analysis system 10 may receive confirmations of the meeting automatically by user's default setting for the meeting invitation (e.g., for meeting invitation from certain people, or during certain time, or regarding certain type of fitness, and the like). The risk analysis system 10 may set up one meeting or a series of meetings based on the user's choice.

After receiving the confirmations to meet from the user and the fitness partner, the risk analysis system 10 may generate a meeting notification and send it to the fitness devices at block 288. In some embodiments, the meeting notification may include network address that allow each fitness device to track another fitness device's activity. That is, one fitness device may track its own activity via the sensors 14 and receive activity data that is transmitted from another fitness device associated with the identified fitness partner. As such, each fitness device may display or present the user's and the fitness partner's fitness data or fitness information so that the user and the fitness partner may access each other's fitness data. The simultaneous presentation of fitness data may encourage each user to maintain or improve his/her fitness activity. In some embodiments, the meeting notification may cause the fitness device to display or present (e.g., via video, audio haptic) an alert at the scheduled meeting time or within a threshold amount of time before the scheduled meeting.

In addition to identifying fitness applications to use together, the present embodiments may include techniques for facilitating in-person meetings. For instance, the user may live in a neighborhood of a fitness partner who has a similar fitness behavior model as the user. The user may conduct a similar fitness activity at a similar schedule with the fitness partner, and it might be appealing to them to conduct the fitness activity together (e.g., in the same park). For example, the user and the fitness partner may conduct outdoor activity in a proximity of location, and the risk analysis system 10 may determine a proximate time and a location for the user and the fitness partner to meet based on their fitness behavior models. As described above, the risk analysis system 10 may determine a meeting location and the meeting time based on the user and the fitness partner's fitness behavior models and locations.

With this in mind, FIG. 7 illustrates a flow chart of a method 300 that the risk analysis system 10 may identify fitness events and send recommendations to a user to encourage a certain type of fitness behavior in view of the user's fitness behavior model and upcoming events. As mentioned above with respect to FIG. 6, the method 300 will be described as being performed by the risk analysis system 10 and in a particular order, but it should be noted that the method 300 may be performed by other suitable computing devices and in any suitable order.

Referring now to FIG. 7, at block 302, the risk analysis system 10 may receive plurality of fitness behavior models. The risk analysis system 10 may receive fitness behavior models from the storage 28, the network 38, the cloud storage 42, the database 36, or other sources (e.g., public records). The risk analysis system 10 may also receive the fitness behavior models from fitness applications.

The risk analysis system 10 may receive fitness event data for plurality of locations at block 304. The risk analysis system 10 may receive fitness event data from the storage 28, the network 38, the cloud storage 42, the database 36, or other sources (e.g., social media). That is, the risk analysis system 10 may query databases, Internet sources, electronic news sources, calendar data for users, and the like to identify fitness event data (e.g., races, triathlons, running groups). In some cases, the risk analysis system 10 may also receive fitness event data from the fitness applications, which may promote certain activities, events, or groups.

The risk analysis system 10 may then, at block 306, identify events to recommend to the user based on the user's fitness behavior model, location data, and the like. The risk analysis system 10 may utilize machine learning algorithms or other identifying techniques to identify fitness events that the user may want to attend based on user's behavior model and the location data. By way of example, a fitness event may be located within a predetermined proximity of the user's location, or the risk analysis system 10 may identify that the time for the fitness event is available for the user based on calendar data, the fitness behavior model, or the like.

At block 308, the risk analysis system 10 may send notifications of the event recommendations to user devices, such as the mobile devices 16, fitness devices, or other devices (e.g., smart appliances, such as a refrigerator with LCD screen, or vehicles). The risk analysis system 10 may display the event recommendations on the user devices, play an audio or a video of the event recommendations on the user devices, or the like to notify the user. The event recommendations may cause the mobile device 16 to automatically open or execute an application to provide a visual, audible, or haptic notification to the user.

The risk analysis system 10 may then, at block 310, receive user selections of the recommended events and save as part of the user fitness behavior model. The risk analysis system 10 may receive selections of events from the user through user input (e.g. typing, recording, sign language) on user devices (e.g. fitness devices, mobile devices, smart appliances, vehicles). The risk analysis system 10 may receive selections of events automatically by user's default setting for events (e.g., for events with certain group of people, or during certain time, or regarding certain type of fitness, and the like).

At block 312, the risk analysis system 10 may send information of the selected events to user devices, such as the mobile devices 16, fitness devices, or other devices (e.g., vehicles, smart appliances). By way of example, the risk analysis system 10 may send the information of the selected events to a vehicle system 44 (either a user vehicle or a rental vehicle), and the vehicle system 44 may log the time and locations of the events. The vehicle system 44 may be part of a vehicle 46, which may be an automatic driving vehicle and may drive the user to the event location on the scheduled time automatically in response to the confirmation of the user.

The risk analysis system 10 may update the database 36 with the new fitness behavior model. After updating the model, the risk analysis system 10 may store the updated model in the database 36. In some embodiments, the risk analysis system 10 may replace the current fitness behavior model with the new fitness behavior model. Additionally, the risk analysis system 10 may store the user fitness behavior models that were generated to the databases 36 or the cloud storages 42. In some embodiments, the risk analysis system 10 may automatically erase the sensor data 12 used in creating the model from the databases 36 or the cloud storages 42 to make space in the databases 36. In some embodiments, the risk analysis system 10 may send a prompt to the mobile device 16 asking the user if the sensor data 12 stored in the databases 36 or cloud storages 42 may be erased. For example, the user may want to save sensor data 12 for future reference rather than erase it immediately after model creation.

As the fitness activities are tracked and recorded in fitness behavior models by the risk analysis system 10, the risk analysis system 10 may update a health insurance policy for the user based on the user's fitness behavior model generated by the updated fitness behavior model. The risk analysis system 10 may adjust user's health insurance policy premium, for example, based on the user's fitness behavior model. The risk analysis system 10 may display the adjusted health insurance policy on user devices for the user to view. The risk analysis system 10 may present multiple new policies for the user to select based on different factors (e.g., levels of insurance premiums). Such automatic notification may be beneficial for the user because it encourages the user to reduce health risks by encouraging good behavior.

Using Smart Device Naming Profiles to Identify Assets

As mentioned above, in addition to using data acquired from smart devices disposed inside a home, vehicle, or other structure, the risk analysis system 10 may generate an area profile model for a user based on naming parameters assigned to certain smart devices. For instance, names assigned to certain outdoor devices in a user's property may provide some insight into the types of rooms, equipment, and devices that the user may have stored at home. These insights may be saved as an area profile model for the user and the risk analysis system may use the model to identify services or products that may be of interest for the user.

Figure 8:
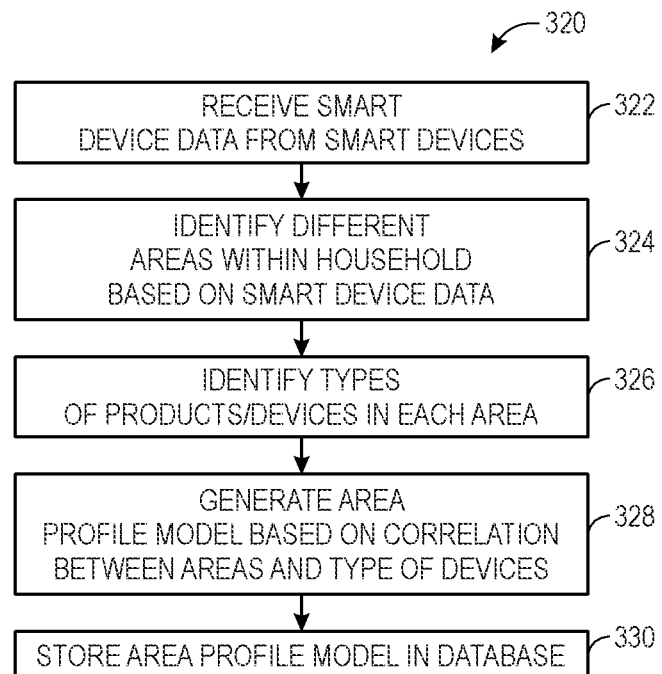
FIG. 8 illustrates a flow chart of a method for generating an area profile model for a user based on the data acquired from the data sources of FIG. 1, in accordance with embodiments described herein.
Figure 9:
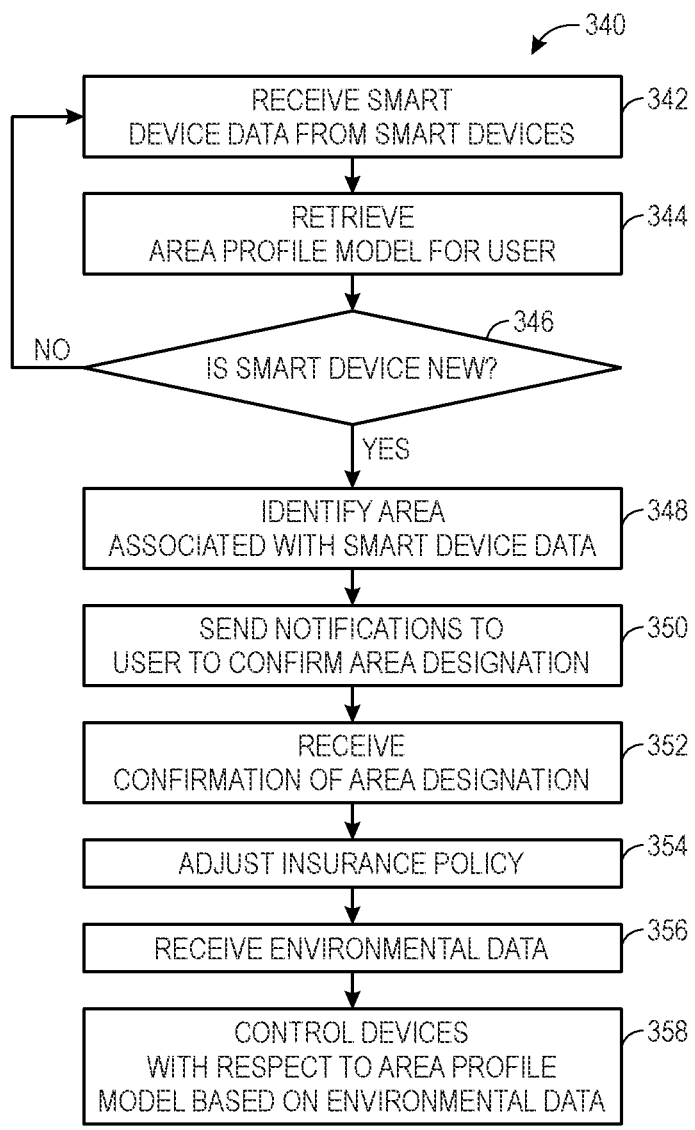
FIG. 9 illustrates a flow charts of a method for adjusting various devices based on an area profile model identified for a user, in accordance with embodiments described herein.

With this in mind, FIGS. 8 and 9 illustrate an example method for creating and updating a model representative of a user area profile based on data acquired from the data sources described above. The risk analysis system 10 may perform operations described below via the processor 24 based on processor-executable code stored in the memory 26 and the storage 28. The processor 24 may execute the processor-executable code to perform sensor data 12 analysis and model creation.

Although the example described in FIGS. 8 and 9 is described in a particular order, it should be noted that the example method may be performed in any suitable order and is not limited to the order presented herein. It should also be noted that although each processing block is described below in the example method as being performed by the risk analysis system 10, other suitable computing systems may perform the methods described herein.

Referring now to FIG. 8, at block 322, the risk analysis system 10 may receive smart device data from smart devices. Smart devices may be used to monitor or control parameters or products in various areas of a user's household. Smart device data may include smart devices' uses, properties, features, operating parameters, and the like. The risk analysis system 10 may receive also smart device data from other resources, such as databases, that collect smart device data for a user or users in a household.

In any case, the smart device data may commands issued to smart devices and the like. When smart devices are initialized or associated with an application or other tool to manage the operation of the smart devices. During initialization, the user may specify to the application names for different smart devices. That is, each smart device may be designated or associated with a name. The name may provide some insight into a location within the household to help the user issue commands to certain smart devices. For example, a smart light switch may be designated as "deck lights" to control lights that may be present in an outdoor deck area for the home. Indeed, naming parameters for smart device may embody room assignment names (e.g., Jim's room), room name (e.g., kitchen, living room, hallway), equipment name (e.g., smart plug used to control fitness equipment, lamp, sprinklers), and the like.

The smart device data may include data packets that store the designated name in a portion (e.g., header, payload, name field) of one or more of the data packets sent from the respective smart device. Alternatively, the risk analysis system 10 may access a server system, database, or other data source that maps the name of the smart device to a particular smart device. In this way, the risk analysis system 10 may become aware of the type of smart devices that are stored in various rooms of the household.

At block 324, the risk analysis system 10 may identify areas in a user's household in which a smart device may be used based on the smart device data received at block 322. In some embodiments, the areas may be identified based on the naming parameters assigned to the smart devices. Areas in a household may also be identified based on the type of smart devices employed. That is, if a smart device corresponds to a smart refrigerator, the risk analysis system may identify a kitchen area as being present in the household.

At block 326, the risk analysis system 10 may identify types of products/devices used in each area of the household based on the smart device data. That is, the smart device data, including the naming parameters, may provide an indication with regard to the types of devices that are present in each area. For instance, if the smart device name includes a device type (e.g., grill), the risk analysis system 10 may identify the device type as being present in a particular area. In addition, the smart device data may provide manufacturer information data in the data packets being sent that specify the type of product associated with the respective smart device.

In some embodiments, the risk analysis system 10 may identify areas within the user's household based on devices connected to the smart device. That is, the smart device may include sensors (e.g., Bluetooth, Wi-Fi) that may detect the presence of other products and devices. The devices detected by the smart device may be provided to the risk analysis system 10 via the smart device data, via a query performed by the risk analysis system 10, or the like. The risk analysis system 10 may then compare the detected products to area models stored in a storage component or some other suitable media. The area models may specify a number of areas and list devices that are expected to be in each respective area. The area models may be determined over time based on a number of users providing information related to the areas (e.g., rooms) in their house and the devices therein. In addition, the area models may be determined using an artificial intelligence engine or machine learning algorithm that scans home design catalogs, product brochures, product advertisements, and the like to associate certain areas in a household with certain devices.

With the foregoing in mind, the risk analysis system 10 may, at block 328, generate an area profile model based on the identified areas in the household and the identified products/devices or types of products/devices that are determined as being present in each area, expected to be present in each area, or both. As such, the risk analysis system 10 may generate an area profile models for the based on the various types of data received from sources mentioned above.

In some embodiments, the risk analysis system 10 may perform the method 320 for a number of individuals. Over time, the risk analysis system 10 may determine expected product types that may be present in each area based on area profile datasets associated with other individuals. That is, the risk analysis system 10 may receive area profile data from a number of users, and the area profile data may specify the types of products or devices that are present in each area of a household or structure (e.g., office). The area profile data may be collected from users via direct input from the users, monitored purchases by the users, insurance policies owned by the users, products covered by insurance policies, and the like.

After generating various area profile models, the risk analysis system 10 may, at block 330, store the area profile models in databases. The area profile models stored in the databases or other suitable storage components may be continuously updated.

With this in mind, FIG. 9 illustrates a flow chart of a method 340 that the risk analysis system 10 may perform to recommend products or services in view of the user's area profile model. As mentioned above with respect to FIG. 8, the method 340 will be described as being performed by the risk analysis system 10 and in a particular order, but it should be noted that the method 340 may be performed by other suitable computing devices and in any suitable order.

Regarding now to FIG. 9, at block 342, the risk analysis system 10 may receive smart device data from smart devices available in a user's household as described above. In some embodiments, the risk analysis system 10 may be an application or program being executed on the same computing device as smart devices being used to control various types of products or parameters. As such, the risk analysis system 10 may monitor the CPU usage data, various memory registers, or other sources of data to determine which smart devices are being used by a user at a time. Additionally, the risk analysis system 10 may collect data regarding the smart devices from network traffic data (e.g., TTL, RTT, network protocol change) acquired from network devices, such as a router. That is, the data packets received by, intercepted by, or provided to the risk analysis system 10 may include a MAC address, such that a first portion of the MAC address may indicate that a particular vendor (e.g., manufacturer) is associated with the product sending the sensor data 12 and a second portion of the MAC address may indicate that the product corresponds to a particular type of device (e.g., lights, plugs). As such, the MAC address may indicate to the risk analysis system 10 a particular product being used. In addition, the risk analysis system 10 may extract information regarding the products being used by the user through application monitoring software and the like.

The user may be a customer of an insurance provider and may submit data regarding the user's insurance policy. As an example, the risk analysis system 10 may retrieve insurance policy information for the user and identify the smart devices that are available in the user's household based on devices listed or indicated in the policy. In addition, the risk analysis system 10 may receive smart device data from the smart devices as described above or using any other embodiments described herein.

At block 344, the risk analysis system 10 may retrieve an area profile model associated with a user or household in which the smart device data is detected. As discussed above, the area profile model may include information related to the areas in a household or structure and devices that may be present in those areas.

At block 346, the risk analysis system 10 may determine whether the smart device data is associated with a new smart device. In some embodiments, the risk analysis system 10 may determine whether smart device is new based on whether the smart device is listed in the area profile model for the user. If the smart device is not new, the risk analysis system 10 may return to block 342 and continue to receive smart device data.

If the smart device is new, the risk analysis system 10 may proceed to block 348 and identify an area associated with the smart device based on the naming parameters and other properties associated with the smart device data as discussed above. By way of example, the risk analysis system 10 may analyze the collected smart data, detected locations of the devices (e.g., backyard, deck, greenhouse, man cave, and the like), and names of the devices/products (e.g., lights for man's cave, temperature for greenhouse) to identify areas of the area profile model that may correspond to the new smart device. Indeed, the new smart device may include a name that may provide an indication related to an expected area based on the process described above. In addition, the risk analysis system 10 may analyze the smart device data and determine operation time of the device, such as morning, evening, weekend, and the like. The risk analysis system 10 may then determine a location of the device based on the operation time and similar operation times of other devices according to the area profile model. That is, if a group of devices in a particular area operate at certain time periods, the risk analysis system 10 may identify the corresponding area as being associated with the new smart device.

At block 350, the risk analysis system 10 may send notification of the identified area for the new smart device to the mobile device 16 or any other suitable device associated with the user to confirm the identified area. The identified area may be associated with expected types of products or services in various areas in user's household. The notification may cause the mobile device 16 to automatically open or execute an application to provide a visual, audible, or haptic notification to the user. In this way, the user may be notified in real time after the new smart device becomes available on the network. At block 352, the risk analysis system 10 may receive a confirmation from the user to update user area profile model with the smart device. The user may correct, add, or delete information in the identified user area profile model. As such, the user may accept the indication that the new smart device is indeed present in the identified area of the area profile model.

In some embodiments, after receiving the confirmation, the risk analysis system 10 may send recommendations or advertisements to the computing device associated with the user to purchase other products or services based on the expected products and services for the respective area according to other area profile models of other users. By way of example, the recommendations may include loans or financial services to help to improve an area in user's household or add products or services in the area. The recommendations may be products or services usually expected in various areas based on the identified user area profile model.

At block 354, the risk analysis system 10 may adjust user insurance policy based on the new smart device. By way of example, the user's insurance policy may be updated and adjusted to reflect the new smart device. In some embodiments, the updated insurance policy may be stored on a distributed ledger that may be accessible via a blockchain or some other suitable technology.

At block 356, the risk analysis system 10 may receive environmental data, such as weather data, social event data, and the like from various data sources. For instance, the risk analysis system 10 may receive environmental data from storages, such as storage 28, database 36, network 38, cloud storage 42, or other sources (e.g., internet, social media, public record). By way of example, the risk analysis system 10 may receive weather forecast and identify an incoming severe weather near user's household. The risk analysis system 10 may utilize machine learning algorithms or other identifying techniques to identify the relationship between environmental data and user insurance coverages/policies. By way of example, the machine learning algorithms may correlate user insurance coverages/policies with environmental data by searching for user household location or related information recorded in a database based on historical correlations between environmental data and user insurance coverages/policies. The machine learning algorithms may update the identified correlations in a database.

At block 358, the risk analysis system 10 may send instructions to user devices to adjust operations of the smart devices based on the received environmental data (e.g., turn of devices during severe thunderstorm) and an area within the respective area profile model. That is, the risk analysis system 10 may commands to certain devices to perform certain action in view of the environmental data. For instance, based on the area profile data, the risk analysis system 10 may determine that devices located outside may be at risk of damage due to an upcoming weather event. As such, the risk analysis system 10 may identify devices that may be present outside the home based on the area profile model. After identifying these devices, the risk analysis system 10 may issue commands to power down prior to the weather event to prevent internal damage due to the devices being actively powered. In addition, the commands may include protective actions that may perform certain actions to prevent damage to the household. For instance, smart irrigation devices may be sent commands to close or restrict water from certain locations to protect water pipes during a freeze event. In some embodiments, the commands issued to these devices may also be provided in notifications to the computing device of the user that may cause the computing device to automatically open or execute an application to provide a visual, audible, or haptic notification to the user. In this way, the user may be notified in real time.

Generating User Streaming Behavior Model

As discussed above, user's activities with respect to certain streaming application may affect the user's behavior in other areas (e.g., driving, living). As such, in some embodiments, the risk analysis system 10 may receive the sensor data 12 that may be representative of the user's streaming behavior and correlate the streaming behavior to other detected sensor data (e.g., driving data, fitness data). The risk analysis system 10 may control operations of a mobile device, a TV, a smart display, other devices (e.g., vehicle), and the like to discourage behavior that may increase risk of an accident or other suitable insurance liabilities.

Figure 10:
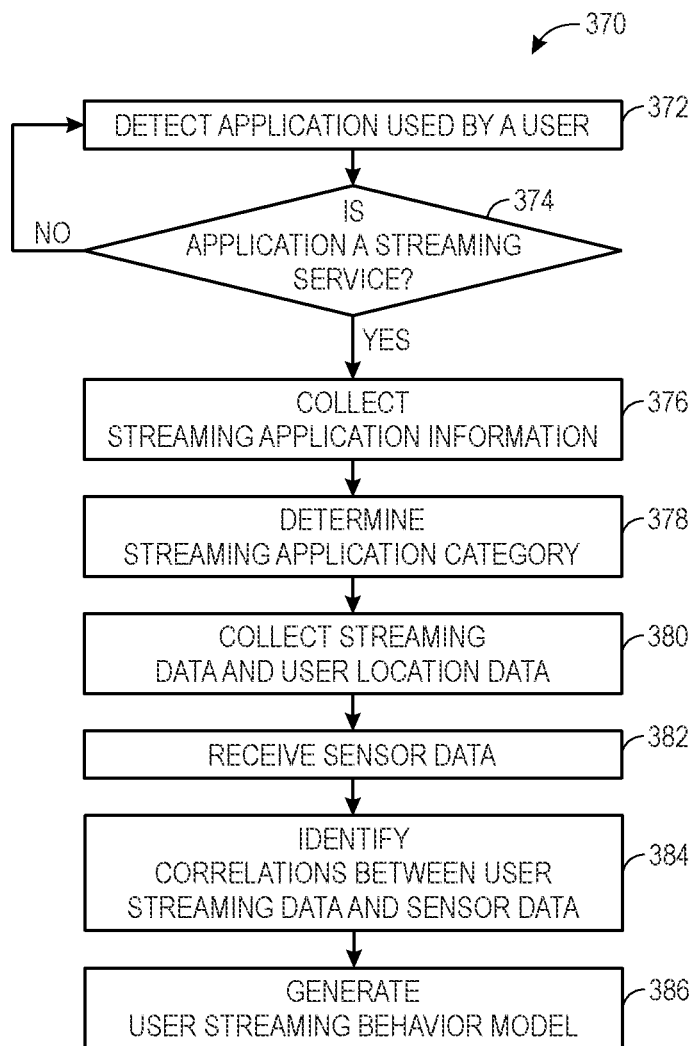
FIG. 10 illustrates illustrate a flow chart of a method for generating a streaming behavior model for a user based on data acquired from the data sources of FIG. 1, in accordance with embodiments described herein.
Figure 11:
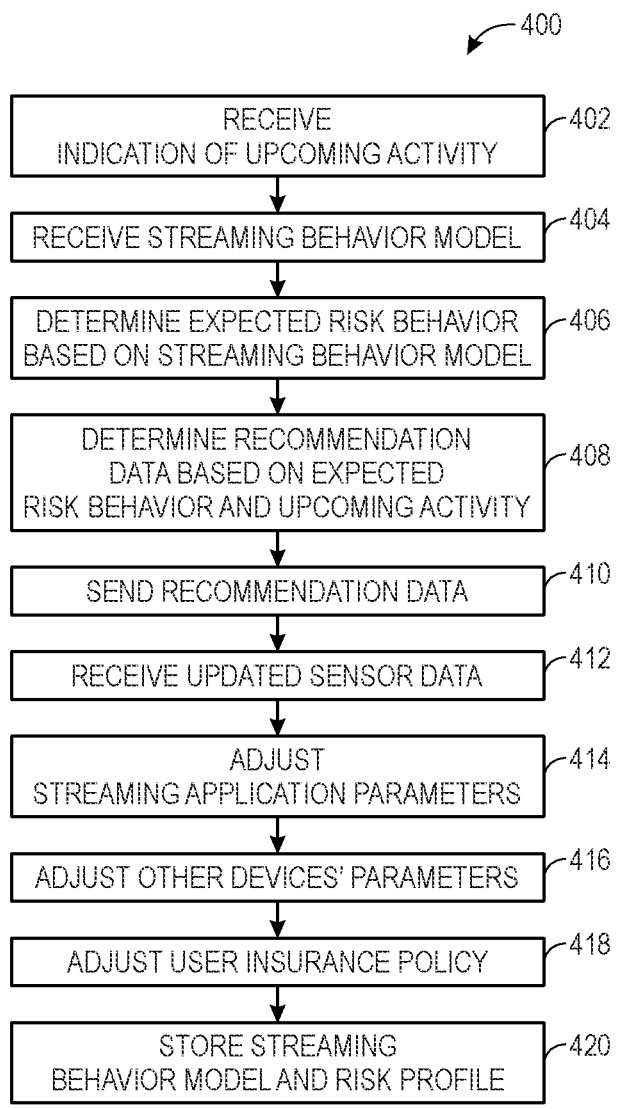
FIG. 11 illustrates a flow chart of a method for adjusting various parameters based on a risk profile determined using the streaming behavior model, in accordance with embodiments described herein.

With this in mind, FIGS. 10-11 illustrates an example method for creating and updating a model representative of user streaming behavior based on data acquired from the data sources described above. The risk analysis system 10 may perform operations described below via the processor 24 based on processor-executable code stored in the memory 26 and the storage 28. The processor 24 may execute the processor-executable code to perform sensor data 12 analysis and model creation.

Although the example described in FIGS. 10 and 11 is described in a particular order, it should be noted that the example method may be performed in any suitable order and is not limited to the order presented herein. It should also be noted that although each processing block is described below in the example method as being performed by the risk analysis system 10, other suitable risk analysis systems may perform the methods described herein.

Referring now to FIG. 10. FIG. 10 illustrates a flow chart of a method 370 that the risk analysis system 10 may generate a streaming behavior model for a user. at block 372, the risk analysis system 10 may detect that an application is being used a user. In some embodiments, the risk analysis system 10 may be an application or program being executed on the same computing device as the application being used. As such, the risk analysis system 10 may monitor the CPU usage data, various memory registers, or other sources of data to determine whether applications are being used by a user. In some embodiments, the risk analysis system 10 may also receive the sensor data 12, which may be provided by devices in which applications are being used by the user. That is, the risk analysis system 10 may periodically acquire or receive data from the sensors 14 and the mobile devices 16. The information received from the sensors 14 may include details related to certain applications or programs being used, such as a type of application, a time, a location, any devices (e.g., electronic glasses, smart display, mouse) associated with the application, a MAC address, or the like. For example, in some embodiments, data packets received by the risk analysis system 10 as the sensor data 12 may include a MAC address, such that a first portion of the MAC address may indicate that a particular vendor (e.g., manufacturer) is associated with the device sending the sensor data 12 and a second portion of the MAC address may indicate that the smart corresponds to a particular type of device (e.g., tablet). As such, the MAC address may indicate to the risk analysis system 10 the particular device being used by the user. In addition to receiving the sensor data 12, the risk analysis system 10 may extract information regarding the application being used by the user through network traffic monitoring, application monitoring software, and the like.

With the foregoing in mind, after detecting the application being used by the user, the risk analysis system 10 may, at block 374, determine whether the application detected at block 374 corresponds to a streaming application. Streaming is the continuous transmission of audio or video files from a server to a client. The streaming application may correspond to any application transmitting any suitable type of multimedia (e.g., video podcasts, audio slideshows, animated videos) that may be played via a tablet, a smart display, a mobile device, or other suitable devices. The user may use the streaming application to watch video, listen to audio, or to broadcast audio or video files.

In some embodiments, the risk analysis system 10 may receive streaming data related to a user using the streaming application via the data sources described above. That is, the risk analysis system 10 may receive streaming data that may indicate that an application operating on the mobile devices 16 (e.g., desktop computers, laptops, smart phones, tablets) or other devices (e.g. smart display, smart appliance) is being accessed by the user. In this way, the risk analysis system 10 may collect data regarding the use of certain streaming applications (e.g., application information, operating time) and the content of the streaming application (e.g., from the application itself, data communicated to the network 38, from the mobile devices 16, or other suitable devices). For example, the risk analysis system 10 may collect data regarding the application and the content of the application from the network traffic data (e.g., TTL, RTT, network protocol change). The risk analysis system 10 may also collect data regarding the application and the content of the application from the sensors 14 associated with or integrated in the mobile devices 16 or other devices. For instance, when using a streaming application, certain devices, such as a screen with image cameras, a special monitor with eye tracking system, a mouse, a speaker, a keyboard, touch sensors, and other components, may provide indications that the detected application corresponds to a streaming application.

Based on the data collected from the sensor data 12 and the other sources of data described above, the risk analysis system 10 may generate a machine learning model to characterize certain combinations of data (e.g., type of connected devices, streaming data, times for accessing application) as a predictive model for determining whether the detected application being used at block 372 is a streaming application. In some embodiments, as the risk analysis system 10 collects data (e.g., network data, sensor data 12, streaming data), the risk analysis system 10 may present a visualization that requests for the user or some other individual to provide an indication of the type of application being used for various combinations of detected or received data. As confirmation feedback is received, the risk analysis system 10 may use machine learning algorithms to better predict whether other applications correspond to the streaming application based on similar patterns. For instance, if streaming applications are executed with a smart display or a particular mobile device (e.g., an Echo Show device) and during a certain time period of a day or a week, or the eye tracking system associated with the executing device indicating certain patterns of user eye movements, the risk analysis system 10 may add this combination of detected data as part of a model for detecting that streaming application is being used.

After determining that the application is a streaming application, the risk analysis system 10 may, at block 376, collect streaming application information from the streaming application. That is, in some embodiments, the risk analysis system 10 may send a request to the streaming application to provide information related to the streaming application. The information may include type of streaming service (e.g., video, audio), title of streaming application (e.g., TikTok®, YouTube®, Twitch®, Hulu®, Netflix®, Pandora® music), a parental rating for the streaming application, and the like. In addition to querying the streaming application, in some embodiments, the risk analysis system 10 may identify the streaming application being executed based on the network traffic data accessible via a router or the like. For example, some streaming applications involve access to a server and the network traffic may identity a host server and thus a streaming application developer or streaming application title.

Based on the collected streaming application information, at block 378, the risk analysis system 10 may determine a streaming application category (e.g., game, movie, music, sports, news, radio, video chat, anime) for the streaming application. The streaming application category may indicate a type or genre of streaming application that the user is using. In some embodiments, the risk analysis system 10 may determine the streaming application category by querying one or more databases that store information related to streaming applications, categories for the streaming applications, parental ratings for the streaming applications, and the like. In addition, the risk analysis system 10 may send a request to the device in which the streaming application is being executed to seek input from the user regarding a streaming application category that corresponds to the streaming application.

At block 380, the risk analysis system 10 may collect streaming data of the streaming application and locations of the user during the streaming. The streaming data may include information related to the streaming application content, play time and duration of the streaming application, and the like. For example, the content of the video or audio, the operation time or duration of the streaming application, and the like. The streaming data may be collected from devices playing the streaming application. In some embodiments, the streaming application may periodically store the streaming data of the user in a time series database that may be accessible by the risk analysis system 10. In other embodiments, the risk analysis system 10 may retrieve streaming data from streaming application log analysis stored in a streaming application server.

In addition, at block 382, the risk analysis system 10 may collect data regarding the streaming application, the content of the streaming application, and the user's activity outside of streaming from the sensors 14 associated with or integrated in the streaming application devices or other devices. The sensors 14 may provide insight into a user's temperament and behavior prior to, during, and after using the respective streaming application. In some embodiments, the sensors 14 may include data related to the user's biometric data (e.g., heartrate, pulse, physical activity, weight, fat percentage) and other health-related parameters that may be received via a wearable sensor, a fitness device, or the like. The risk analysis system 10 may collect and store the received sensor data in a time series database and characterize the data as pre-streaming application data, during streaming data, and post streaming data.

In addition to the biometric data, the risk analysis system 10 may receive data from the peripheral devices (e.g., microphone, camera, eye tracking system on a monitor) that the user uses during the streaming. The data from the peripheral devices may provide a confirmation that the user is using a streaming application based on patterns of inputs received from the peripheral devices. In some embodiments, the frequency of inputs, patterns on inputs, pitch of detected voice, movements of eye, and other data features detected by the peripheral devices may enrich the input data or sensor data to provide additional insight into the user's temperament or mood. That is, for example, if the user's pupil is smaller or bigger than his baseline pupil size (e.g., in pre-streaming application data) or the user's eye movements are less or more than his baseline data (e.g., in pre-streaming application data), the risk analysis system 10 may determine that the user is in an emotional mood rather than a neutral mood. In some embodiments, the data from the peripheral devices may include user gesture information (e.g., face or body gestures) during the streaming, which may provide insight into the user's temperament or mood. By way of example, the user's face gesture may be recognized to indicate the user's temperament or mood.

The sensor data 12 may also include vehicle data that details various properties associated with the user's driving behavior. The vehicle data may thus include braking data indicative of a reaction time used during braking, speed data relative to speed limits, stability data related to a number of lane changes that the user makes, mobile activity data (e.g., using mobile computing device while driving), driving distance data, and the like. The vehicle data may also include information of streaming applications used during user's driving period. By way of example, the user may use certain streaming applications while driving. The vehicle data may include information associated with the streaming applications, streaming data, user location, and the like. By including the vehicle data in the analysis, the risk analysis system 10 may receive some insight into the user's driving behavior relative to the streaming application used by the user before or during the driving. That is, the user's streaming data may provide an indication with regard to the user's mood or current behavior properties, which may affect the user's driving behavior. For instance, if the user spends more than a threshold of time watching or listening to streaming of short formats of videos or audios, the user may have reduced attention span, which may provide some insight into the user's driving distance limits.

In addition to the sensor data mentioned above, the risk analysis system 10 may receive the data directly from the user, the network 38, the mobile devices 16, other devices, or other sources (e.g., public records). By way of example, the user may submit data regarding the user's mood or anxiety level directly to the risk analysis system 10 by way of input via the mobile device 16 or the like.

At block 384, the risk analysis system 10 may analyze the collected sensor data 12 and the streaming data to identify correlations between user streaming data and the collected sensor data 12. In some embodiments, the risk analysis system 10 may extract information (e.g., location, time) from the sensor data 12 and compare it to the user streaming data (e.g., location, time) to identify changes in both data sets that correlate or correspond to each other. In some embodiments, the risk analysis system 10 may utilize machine learning algorithms or other identifying techniques to determine the relationship between the user streaming data and the sensor data 12. By way of example, the machine learning algorithms may correlate streaming application information (e.g. streaming application title, streaming application category) with the sensor data 12 (e.g. vehicle data, fitness data, gameplay data).

After making the comparison, the risk analysis system 10 may determine that some of the sensor data 12 is not related to the user streaming data and thus may refrain from evaluating the respective portion of the sensor data 12 for future analysis. On the other hand, if the sensor data 12 is related to the streaming data, the risk analysis system 10 may utilize machine learning algorithms or other identifying techniques to determine or identify correlations between the user streaming data and the sensor data 12. The streaming data and the sensor data 12 may be determined to be related to each other if each set of data consistently changes within a time period of each other. For instance, if the streaming data indicates (e.g., more than a threshold of time) that the user is watching or broadcasting a streaming of fitness tips or lessons and the sensor data 12 consistently indicates that the user spends more time on fitness devices within the same day or week, then the streaming data and the sensor data 12 may be determined to be related to each other. In another example, if the streaming data indicates (e.g., more than a threshold of time) that the user watches or broadcasts a streaming of healthy diet (e.g., eating habit, living habit) during a time period and the sensor data 12 consistently indicates that the user's biometric data (e.g., heartrate, pulse, physical activity, weight, fat percentage) and other health-related parameters change within the same time period, then the streaming data and the sensor data 12 may be determined to be related to each other.

If the streaming data and the sensor data 12 are related to each other, by way of example, the machine learning algorithms may identify relevant correlations by searching for streaming application information (e.g., streaming application name, streaming application category), sensor data types (e.g., driving behavior, fitness data, gameplay data), or related information recorded in a database based on historical correlations between user streaming data and the sensor data 12. The machine learning algorithms may update the identified correlations in a database.

The time and money the user spends on streaming applications may provide insight into the user's interests. As such, the risk analysis system 10 may gain insight into a type of services and products that may be appealing to the user. For example, the user may be interested in fitness services if the user spends more than a threshold of time or money (e.g., money used to pay for streaming applications) using streaming application (receiving or broadcasting) related to sports or fitness, and the user may be interested in beauty service if the user spends more than a threshold of time or money watching/broadcasting makeup tutorials on YouTube. In addition, the time the user spends on using streaming applications may provide insight into the user's health behavior. For instance, if the user spends more than a threshold of time using streaming applications, he may spend less time doing exercise or sleeping.

The ratio of the time the user spends on a certain portion of a streaming application over the total time the user spends on the streaming application may provide insight into the user's interests. For example, if an eye tracking system on a monitor or screen detects the user spending more than a threshold value of ratio of the time on a portion of a video regarding a certain product or service, he may have interests in the product or service.

After identifying the correlations, the risk analysis system 10 may proceed to block 386 and generate a streaming behavior model based on the correlations between the user streaming data and the sensor data 12. The streaming behavior model may provide an expected risk score or expected behavior data (e.g., driving behavior, health behavior) based on the user's streaming data (e.g., type of streaming application, content of streaming, amount of time played). The expected behavior data may correspond to expected driving behavior data, expected gameplay behavior data, expected fitness behavior data, expected living behavior data (e.g., types of foods to eat, amount of sleep time), and the like.

Based on the expected behavior data provided in the streaming behavior model, the risk analysis system 10 may generate recommendations, modify streaming parameters, adjust vehicle system parameters, or the like. That is, the risk analysis system 10 may attempt to modify the user's behavior to reduce a risk of injury or accident when driving a vehicle, exercising, or performing any similar activity that may be affected by the user's streaming behavior.

With this in mind, FIG. 11 illustrates a flow chart of a method 400 that the risk analysis system 10 may perform to encourage a certain type of behavior in view of the user's streaming behavior model. As mentioned above with respect to FIG. 10, the method 400 will be described as being performed by the risk analysis system 10 and in a particular order, but it should be noted that the method 400 may be performed by other suitable computing devices and in any suitable order.

Referring now to FIG. 11, at block 402, the risk analysis system 10 may receive an indication of an upcoming activity to be performed by the user. The activity may include accessing a vehicle to drive, taking a walk, meeting a friend, eating a lunch/dinner, or the like. In some embodiments, the upcoming activity may be detected based on meeting data (e.g., calendar entry), an input received via a global positioning system or the mobile device 16, or the like. In addition, if the user was using a streaming application, a certain activity may be expected to be performed after the streaming. In addition, the risk analysis system 10 may predict user upcoming activity data based on patterns of behavior identified based on machine learning techniques and the like. For instance, the user may be expected to travel to a certain location every morning based on his location data indicative of the travel.

After detecting the upcoming activity, at block 404, the risk analysis system 10 may receive streaming behavior model associated with the user, and, at block 406, the risk analysis system 10 may determine expected risk behavior based on the received streaming behavior model. In some embodiments, the expected risk behavior may be related to streaming applications used by the user within a threshold amount of time.

Based on the received streaming behavior model, the risk analysis system 10 may determine expected risk behavior. In some embodiments, the risk analysis system 10 may receive an indication (e.g., via Bluetooth connection to vehicle) that the user is driving a vehicle. Based on the expected risk behavior associated with the user's streaming behavior model, the risk analysis system 10 may, at block 408, determine recommendation data. The recommendation data may include recommended precautions against speeding, recommended reminders for braking, recommended driving distance, and other recommendations. The recommendation data may be based on the relationship between the upcoming activity and the streaming data associated with the user. That is, certain streaming applications may cause users to drive in an expected fashion, and the risk analysis system 10 may generate recommendations to ensure that the user isn't negatively affected by the streaming.

At block 410, the risk analysis system 10 may send the recommendation data to the mobile device 16 or any other suitable device associated with the user. The recommendation data may cause the mobile device 16 to automatically open or execute an application to provide a visual, audible, or haptic notification to the user. In this way, the user may be notified in real time to sufficiently inform the user of the recommendations to improve the user's behavior and reduce driving risks.

After sending the recommendation data, at block 412, the risk analysis system 10 may receive updated sensor data 12. The updated sensor data 12 may confirm whether the user is heeding the notifications and recommendations. Based on the updated sensor data 12, the risk analysis system 10 may adjust streaming parameters, adjust other device parameters, and adjust user insurance policies accordingly.

That is, at block 414, the risk analysis system 10 may modify streaming parameters based on the updated sensor data 12 indicative of the user following the recommendations or not. If the user follows the recommendations, the risk analysis system 10 may enable the user to access various streaming applications, increase streaming time limits, and the like. Conversely, if the user does not follow the recommendations or the updated sensor data 12 indicates that the user engages in behavior that is not consistent with a baseline behavior (e.g., driving speed limit, avoiding mobile phone activity), the risk analysis system 10 may adjust the streaming parameters to reduce the streaming time or limit certain streaming applications available to the user.

At block 416, the risk analysis system 10 may adjust other devices' parameters (e.g., the speed limit on user's vehicle, the operation time on user's TV). The other devices may include applications (e.g., gaming, social media, fitness, streaming, food delivery) on the mobile device 16 or the like. In addition, the device parameters may include access to a vehicle, operations of the vehicle, accessories (e.g., radio, GPS) of the vehicle, driving parameters (e.g., speed, distance, location) of the vehicle, and the like.

With an accurate representation of the user risk profile, the risk analysis system 10 may determine an updated insurance policy based on the updated sensor data 12 at block 418. The adjusted policy information may include modified premium values based on the updated sensor data 12. That is, if the user followed the recommendations or improved his driving behavior, the risk analysis system 10 may reduce his premium for auto insurance. Similarly, if the user followed the recommendations or improved his eating habit or living behavior, the risk analysis system 10 may reduce his premium for health insurance. The risk analysis system 10 may then send an additional notification to the use's device to display the adjusted insurance policy for the user to view. The risk analysis system 10 may present multiple new policies for the user to select based on different factors (e.g., levels of insurance premiums). Such automatic notification may be beneficial for the user because it allows the user to maintain an accurate and complete policy.

At block 420, the risk analysis system 10 may update the database 36 with the new streaming behavior model, which may be updated based on the user's updated sensor data 12. After updating the model, the risk analysis system 10 may store the updated model in the database 36. In some embodiments, the risk analysis system 10 may replace the current streaming behavior model with the new streaming behavior model. Additionally, the risk analysis system 10 may store the user risk profiles that were generated to the databases 36 or the cloud storages 42. In some embodiments, the risk analysis system 10 may automatically erase the sensor data 12 used in creating the model from the databases 36 or the cloud storages 42 to make space in the databases 36. In some embodiments, the risk analysis system 10 may send a prompt to the mobile device 16 asking the user if the sensor data 12 stored in the databases 36 or cloud storages 42 may be erased. For example, the user may want to save sensor data 12 for future reference rather than erase it immediately after model creation.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] in [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system comprising:
  a communication component;
  a storage;
  a processor configured to couple to the communication component and the storage, wherein the processor is configured to:
  receive application data representative of one or more applications used by a user;
  in response to determining that the application data corresponds to a gaming application, collect game information for the gaming application;
  collect user activity data associated with a game play by the user for the gaming application, wherein the user activity data comprises user activity in the gaming application during a time period;
  receive sensor data acquired by one or more devices used by the user, wherein the sensor data comprises biometric information associated with the user during the time period;

identify one or more correlations between the user activity data and the sensor data based on one or more correlated changes in the user activity data and the sensor data;

generate a risk profile for the user based at least partially on the user activity data and the sensor data, wherein the risk profile indicating a relationship between the user activity data and a behavior of the user;

generate a gameplay behavior model based on the one or more correlations and the risk profile;

receive an indication of an upcoming activity expected to be performed by the user, wherein the upcoming activity is associated with operating a vehicle;

receive biometric data associated with the user, wherein the biometric data is indicative of a temperament of the user;

determine recommendation data for the upcoming activity based on the gameplay behavior model and the biometric data, wherein the recommendation data comprises one or more recommendations associated with operating the vehicle;

send the recommendation data to a computing device associated with the user;

receive updated sensor data corresponding to one or more operations of the vehicle associated with the user acquired by the one or more devices;

adjust a gameplay parameter in response to the updated sensor data being indicative of the user disregarding the recommendation data, wherein the gameplay parameter comprises a time or a time duration for the user to access the gaming application;

adjust one or more parameters of the one or more devices in response to the updated sensor data being indicative of the user disregarding the recommendation data; and adjust an insurance policy associated with the user in response to the updated sensor data being indicative of the user disregarding the recommendation data.

2. The system of claim 1, wherein the gameplay behavior model is determined by applying a machine learning algorithm to the one or more correlations.

3. The system of claim 1, wherein the game information comprises a category of game.

4. The system of claim 1, wherein the user activity data in the gaming application comprises an avatar, a character, an action of the user in the gaming application, an amount of money spent on game enhancements or features, or any combination thereof.

5. The system of claim 1, wherein the sensor data and the updated sensor data are associated with a driving behavior of the user.

6. The system of claim 1, wherein the gameplay parameter comprises a gameplay feature for the user to play the gaming application.

7. The system of claim 1, wherein the processor is configured to:
determine an expected risk behavior for the user based on the gameplay behavior model; and
determine the recommendation data based on the expected risk behavior and the upcoming activity.

8. A method comprising:
receiving, via a processor, application data representative of one or more applications used by a user;
in response to determining that the application data corresponds to a gaming application, collecting, via the processor, game information for the gaming application;

collecting, via the processor, user activity data associated with a game play by the user for the gaming application, wherein the user activity data comprises user activity in the gaming application during a time period of the game play;

receiving, via the processor, sensor data acquired by one or more devices used by the user, wherein the sensor data comprises biometric information associated with the user during the time period;

identifying, via the processor, one or more correlations between the user activity data and the sensor data based on one or more correlated changes in the user activity data and the sensor data;

generate a risk profile for the user based at least partially on the user activity data and the sensor data, wherein the risk profile indicating a relationship between the user activity data and a behaviour of the user;

generating, via the processor, a gameplay behavior model based on the one or more correlations and the risk profile;

receiving, via the processor, an indication of an upcoming activity expected to be performed by the user, wherein the upcoming activity is associated with operating a vehicle;

receiving, via the processor, biometric data associated with the user, wherein the biometric data is indicative of a temperament of the user;

determining, via the processor, recommendation data for the upcoming activity based on the gameplay behavior model and the biometric data, wherein the recommendation data comprises recommendations associated with operating the vehicle;

sending, via the processor, the recommendation data to a computing device associated with the user;

receiving, via the processor, updated sensor data corresponding to one or more operations of the vehicle associated with the user acquired by the one or more devices;

adjusting, via the processor, a gameplay parameter in response to the updated sensor data being indicative of the user disregarding the recommendation data, wherein the gameplay parameter comprises a time or a time duration for the user to access the gaming application;

adjusting, via the processor, one or more parameters of the one or more devices in response to the updated sensor data being indicative of the user disregarding the recommendation data; and adjusting, via the processor, an insurance policy associated with the user in response to the updated sensor data being indicative of the user disregarding the recommendation data.

9. The method of claim 8, comprising applying a machine learning algorithm to the one or more correlations to determine the gameplay behavior model.

10. The method of claim 8, wherein the sensor data is associated with a driving behavior of the user.

11. The method of claim 8, wherein adjusting the gameplay parameter comprises adjusting equipment features, extra life feature, avatar skin features, or any combination thereof for the user to play the gaming application.

12. The method of claim 8, comprising:
determining, via the processor, an expected risk behavior for the user based on the gameplay behavior model; and
determining, via the processor, the recommendation data based on the expected risk behavior and the upcoming activity.

13. A non-transitory, computer readable medium comprising instructions that, when executed by a processor, causes the processor to perform operations comprising:
- receiving an indication of an upcoming activity expected to be performed by a user, wherein the upcoming activity is associated with operating a vehicle;
- receiving a gameplay behavior model determined by:
- collecting user activity data associated with a game play by the user for a gaming application, wherein the user activity data comprises user activity in the gaming application during a time period of the game play;
- receiving sensor data acquired by one or more devices used by the user, wherein the sensor data comprises biometric information associated with the user during the time period;
- identifying one or more correlations between the user activity data and the sensor data based on one or more correlated changes in the user activity data and the sensor data;
- generating a risk profile for the user based at least partially on the user activity data and the sensor data, wherein the risk profile indicating a relationship between the user activity data and a behavior of the user; and
- generating the gameplay behavior model based on the one or more correlations and the risk profile;
- receiving biometric data associated with the user, wherein the biometric data is indicative of a temperament of the user;
- determining recommendation data for the upcoming activity based on the gameplay behavior model and the biometric data, wherein the recommendation data comprises recommendations associated with operating the vehicle;
- sending the recommendation data to a computing device associated with the user;
- receiving updated sensor data corresponding to one or more operations of the vehicle associated with the user acquired by the one or more devices;
- restricting access to the gaming application in response to the updated sensor data being indicative of the user disregarding the recommendation data;
- adjusting one or more parameters of the one or more devices in response to the updated sensor data being indicative of the user disregarding the recommendation data; and
- adjusting an insurance policy associated with the user in response to the updated sensor data being indicative of the user disregarding the recommendation data.

14. The non-transitory, computer readable medium of claim 13, the operations comprise applying a machine learning algorithm to the one or more correlations to determine the gameplay behavior model.

15. The non-transitory, computer readable medium of claim 13, wherein the one or more devices comprises one or more sensors configured to acquired data associated with a driving behavior of the user.

16. The non-transitory, computer readable medium of claim 13, the operations comprise:
- determining an expected risk behavior for the user based on the gameplay behavior model; and
- determining the recommendation data based on the expected risk behavior and the upcoming activity.

* * * * *